(12) United States Patent
Ishibashi

(10) Patent No.: US 8,944,696 B2
(45) Date of Patent: Feb. 3, 2015

(54) CAGE FOR RADIAL ROLLER BEARING

(71) Applicant: NSK Ltd., Tokyo (JP)

(72) Inventor: Yutaka Ishibashi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/824,797

(22) PCT Filed: Oct. 16, 2012

(86) PCT No.: PCT/JP2012/076736
§ 371 (c)(1),
(2) Date: Jun. 18, 2013

(87) PCT Pub. No.: WO2013/058246
PCT Pub. Date: Apr. 25, 2013

(65) Prior Publication Data
US 2014/0112609 A1   Apr. 24, 2014

(30) Foreign Application Priority Data

Oct. 17, 2011   (JP) .................................. 2011-227776
Oct. 17, 2011   (JP) .................................. 2011-228035
Oct. 17, 2011   (JP) .................................. 2011-228036

(51) Int. Cl.
*F16C 33/46* (2006.01)
*F16C 33/51* (2006.01)
*F16C 19/48* (2006.01)

(52) U.S. Cl.
CPC ......... *F16C 33/4635* (2013.01); *F16C 33/4694* (2013.01); *F16C 33/516* (2013.01); *F16C 19/48* (2013.01); *F16C 2361/61* (2013.01)
USPC .......................................... 384/576; 384/577

(58) Field of Classification Search
USPC .......................... 384/572, 573, 576, 577, 578
See application file for complete search history.

(56) References Cited

U.S. PATENT DOCUMENTS 3,353,881 A * 11/1967 Steinert .......................... 384/577
3,388,952 A *  6/1968 Schaeffler ...................... 384/576

(Continued)

FOREIGN PATENT DOCUMENTS

| CN | 102224350 A | 10/2011 |
|---|---|---|
| DE | 4222175 A1 | 1/1994 |

(Continued)

*Primary Examiner* — Thomas R. Hannon
(74) *Attorney, Agent, or Firm* — Miles & Stockbridge P.C.

(57) ABSTRACT

Achieved is a cage for a radial roller bearing that is made by axial draw molding, and that can suppress wear due to friction between the end sections in the axial direction and the guide surfaces of the opposing members, without the assembly direction being restricted, even when guide surfaces of opposing members are not able to support the cage over the entire area of the end surfaces in the axial direction. The cage 7c is composed of a pair of circular ring shaped rim sections 8e, 8f and a plurality of column sections 9, with the spaces between column section 9 that are adjacent in the circumferential direction functioning as pockets 10. Outer-diameter side concave sections 23a, 23b are provided at a plurality of locations on the outer circumferential surfaces of the rim sections 8e, 8f in portions that are aligned in the axial direction with the pockets 10, and inner-diameter side concave sections 24a, 24b are provided at a plurality of locations having a different phase in the circumferential direction than the outer-diameter concave sections 23a, 23b on the inner circumferential surfaces of the rim sections 8e, 8f in portions that are aligned in the axial direction with the pockets 10. Moreover, on one rim section 8e and the other rim section 8f, the phases in the circumferential direction of the outer-diameter side concave sections 23a, 23b and the inner-diameter side concave sections 24a, 24b are different.

8 Claims, 26 Drawing Sheets

(56) References Cited

U.S. PATENT DOCUMENTS

| | | | |
|---|---|---|---|
| 3,729,239 A * | 4/1973 | Camosso | 384/575 |
| 3,881,790 A * | 5/1975 | Ryanen | 384/576 |
| 5,165,805 A * | 11/1992 | Bauer et al. | 384/572 |
| 8,057,105 B2 * | 11/2011 | Earthrowl et al. | 384/577 |
| 2011/0249928 A1 | 10/2011 | Kondou | |
| 2012/0275741 A1 * | 11/2012 | Ishibashi | 384/572 |

FOREIGN PATENT DOCUMENTS

| | | |
|---|---|---|
| DE | 4400718 A1 | 7/1995 |
| EP | 2518354 A1 | 10/2012 |
| GB | 1352909 A1 | 5/1974 |
| JP | 48-59926 U | 7/1973 |
| JP | 54-111242 U | 8/1979 |
| JP | 55-114435 U | 8/1980 |
| JP | 60-71728 U | 5/1985 |
| JP | 2-89814 A | 3/1990 |
| JP | 2008-8333 A | 1/2008 |
| JP | 2011-89612 A | 5/2011 |
| WO | WO 2011/078359 A1 | 6/2011 |

\* cited by examiner

CAGE FOR RADIAL ROLLER BEARING

TECHNICAL FIELD

The present invention relates to a cage for a radial roller bearing that is assembled in a radial roller bearing that is used in an automobile transmission or the like and is made using axial draw molding.

BACKGROUND ART

Large loads are applied in the radial direction during operation to the rotational support section of various kinds of power mechanisms in a vehicle such as an automobile or train. Therefore, conventionally, radial bearings 1, such as illustrated in FIG. 24, that have excellent load performance for loads in the radial direction have been widely used as the bearings in this kind of rotational support section.

A radial roller bearing 1 is constructed such that a plurality of rollers (including needle rollers) are held between a cylindrical shaped outer-ring raceway 3, which is formed around the inner circumferential surface of an outer-diameter side member 2 such as a housing that does not rotate during operation, and a cylindrical shaped inner-ring raceway 5, which is formed around the outer circumferential surface of a shaft 4 such as a rotating shaft, by a cage 7 so as to be able to roll freely. Examples of the outer-diameter side member 2 and the shaft 4 also include a combination of a gear or roller that rotates during operation and a support shaft thereof that does not rotate during operation.

The cage 7 is made into a complete cylindrical shape using a synthetic resin material. As illustrated in FIG. 25, this cage 7 has a pair of rim sections 8, which are circular ring shaped and that are arranged concentric with each other, having a space between them in the axial direction, and a plurality of column sections 9, which intermittently located in the circumferential direction and span between the rim sections 8. The portions that are surrounded on four sides by adjacent column sections in the circumferential direction and the rim sections 8 on both sides function as pockets 10 for holding the rollers 6 so as to be able to roll freely. The cage 7 holds the rollers 6 inside the pockets 10 so as to be able to rotate freely, and with a plurality of rollers 6 arranged in the circumferential direction with a specified interval between them (for example a uniform interval), the cage 7 is arranged between the inner circumferential surface of the outer-diameter side member 2 and the outer circumferential surface of the shaft 4 so as to be able to freely rotate relative to the outer-diameter member 2 and the shaft 4. The cage 7 rotates relative to the outer-diameter side member 2 and shaft 4 due to the revolving motion of the rollers 6.

Axial draw molding, which is one method for forming this kind of cage, is performed by performing injection molding of synthetic resin into the cavity of a mold (axial draw mold) that is composed of a pair of split molds (mold elements), after which these split molds are pulled apart in the axial direction. Therefore, when removing the split molds, the split molds are pulled apart such that stopper sections (portions that correspond to engagement allowance), which are provided so as to hang over the edge sections of the opening of the pockets and are for preventing the rollers from falling out, are not damaged by plastically deforming or whitening. Therefore, axial draw molding is used when it is necessary to increase the volume of the stopper sections due to an increase in the roller diameter or increase in the number of rollers, and the work of elastically pressing and expanding the stopper sections and removing the mold elements from the outer-diameter side becomes difficult, and when removing the mold elements to the outside in the radial direction by arranging the column sections further outward in the radial direction than the pitch circle diameter of the rollers. For example, when using radial draw molding, which uses metal mold elements that move in the radial direction, when making a cage having construction in which the volume of the stopper sections is large, curling back of the stopper sections becomes large, and the stopper sections are not able to sufficiently prevent the rollers from coming out. On the other hand, with axial draw molding, the mold elements can be removed without curling back the stopper sections, so the stopper elements can sufficiently prevent the rollers from coming out.

Incidentally, when assembling the radial roller bearing 1, in order to place the cage 7 around the inner-ring raceway 5, the cage 7 may need to be inserted from the end section of the shaft 4, and further moved in the axial direction until it surrounds the inner-ring raceway 5. However, when there is an obstacle such as a flange shaped protrusion whose outer diameter dimension is larger than the inner diameter dimension of the cage 7 located in a portion of the outer circumferential surface of the shaft 4 in the axial direction between the end section of the shaft 4 and the inner-ring raceway 5, that obstacle will be in the way, and it is not possible to move the cage in the axial direction to where it will surround the inner-ring raceway 5.

Therefore, as a cage that is able to eliminate this kind of problem, a cage (split cage) is disclosed in JP 2-089814 (A) and GB 1,352,909 (A) that is made using axial draw molding so as to have non-continuous section in one location in the circumferential direction. FIG. 26 illustrates the cage 7a that is disclosed in GB 1,352,909 (A). The cage 7a is made using synthetic resin, and cuts 18a, 18b are provided in portions of the pair of rim sections 8a, 8b where the phase in the circumferential direction is nearly the same as each other. As a result, a non-continuous section 11 is formed at one location in the circumferential direction of the cage 7a. End sections 12a, 12b of the cage 7a that are composed of the rim sections 8a, 8b and column sections 9 and that are provided on both sides of the non-continuous section 11 fit together with an uneven fit by way of a fitting section 13 such that relative displacement in the axial direction and radial direction is not possible.

A set each of outer-diameter side fitting pieces 14a, 14b and inner-diameter side fitting pieces 15a, 15b that make up the fitting section 13 are formed on the end sections 12a, 12b. More specifically, on one end section 12a, an outer-diameter side fitting piece 14a is formed on one half section in the axial direction of the outer-diameter side half section, and an inner-diameter side fitting piece 15a is formed on the other half section in the axial direction of the inner-diameter side half section. Moreover, on the other end section 12b, an outer-diameter side fitting piece 14b is formed on the other half section in the axial direction of the outer-diameter side half section, and an inner-diameter side fitting piece 15b is formed on the one half section in the axial direction of the inner-diameter side half section. In the outer-diameter side half section and inner-diameter side half section of the fitting section 13, the pair of outer-diameter side fitting pieces 14a, 14b and pair of inner-diameter side fitting pieces 15a, 15b fit together in the axial direction. Moreover, in the one half section in the axial direction and the other half section in the axial direction of the fitting section 13, the outer-diameter side fitting piece 14a and the inner-diameter side fitting piece 15b, and the outer-diameter side fitting piece 14b and the inner-diameter side fitting piece 15a fit together in the radial direction. The example in the figure illustrates the state in which the end sections 12a, 12b are not fitted together, however, when the cage 7a is assembled in the radial roller bearing, the width of the non-continuous section 11 is narrowed and the end sections 12a, 12b fit together.

Moreover, outer-diameter side concave sections 16a and inner-diameter side concave sections 16b are formed on the circumferential surfaces of the pair of rim sections 8a, 8b. More specifically, on the outer circumferential surface of one rim section 8a, outer-diameter side concave sections 16a that are recessed inward in the radial direction are formed in the portions that are aligned in the axial direction with the pockets 10, and on the inner circumferential surface of the other rim section 8b, inner-diameter side concave sections 16b that are recessed outward in the radial direction are formed in the portions that are aligned in the axial direction with the pockets 10.

The cage 7a, having construction such as described above, is formed using axial draw molding. Therefore, when compared with a cage that is made using radial draw molding in which the mold is composed of a pair of mold elements that move in the axial direction and a plurality of mold elements that move in the radial direction, and thus the shape thereof is complex, it is possible to keep the manufacturing cost low. Furthermore, by elastically deforming the cage 7a, it is possible to expand the width of the non-continuous section 11 in the circumferential direction. Therefore, by expanding the width of this non-continuous section so as to be larger than the dimension of the outer diameter of the shaft 4, such as the rotating shaft, with which the cage 7a is assembled, the non-continuous section 11 can pass over the shaft 4, and the cage 7a can be assembled around the shaft 4. Alternatively, by elastically expanding the inner diameter dimension of the cage 7a enough to be able to pass over an obstacle, it is also possible to assemble the cage 7a by moving the cage in the axial direction to where it is around the shaft 4.

In the case of a cage 7a having construction such as described above, the shapes of both end surfaces in the axial direction (shape of the side surfaces in the axial direction of the pair of rim sections 8a, 8b) are different on one end side and the other end side. More specifically, the rim section 8a on one end side is such that outer-diameter side concave sections 16a are formed on the outer circumferential surface, so the side surface on the outer diameter side thereof becomes a non-continuous surface, and the outer-diameter dimension thereof is larger in the portions that are aligned in the axial direction with the column sections 9 than in the portions that are aligned in the axial direction with the pockets, however the side surface on the inner-diameter side of the rim section 8a on one end side is a continuous surface, and the inner-diameter dimension thereof is fixed. On the other hand, the rim section 8b on the other end side is such that inner-diameter side concave sections 16b are formed on the inner circumferential surface, so the side surface on the outer-diameter side is a continuous surface, and the outer-diameter dimension thereof is fixed, however, the side surface on the inner-diameter side of the rim section 8b on the other end side is a non-continuous surface, and the inner-diameter dimension in portions that are aligned in the axial direction with the columns 9 is less than in portions that are aligned in the axial direction with the pockets 10.

Even when using the cage 7a in which the shapes of the end surface on both ends in the axial direction are different in this way, as long as the guide surface that is provided on the opposing members such as the rotating shaft around which the radial roller bearing is assembled has construction that is able to support the entire area of the end surfaces in the axial direction of the cage 7a (the entire range in the radial direction and circumferential direction), there is no particular problem.

However, in the case of construction in which the guide surface that is provided on the opposing member is not able to support the entire area of the end surfaces in the axial direction of the cage 7a, such as in the case of lining of a DCT (dual clutch transmission), there is a possibility that the following problems will occur. In other words, on both end surfaces in the axial direction of the cage 7a, when the non-continuous sections where the area becomes small (side surface on the outer-diameter side of the rim section 8a, or side surface on the inner-diameter side of the rim section 8b) come in contact with the guide surfaces of the opposing members and thus the radial roller bearing is guided (positioned) in the axial direction, there is a possibility that the non-continuous sections and the guide surfaces will come in strong contact due to a pressure force in the axial direction caused by skewing of the rollers, which causes wear due to friction on the end surfaces (non-continuous sections) in the axial direction of the cage 7a. In order to prevent the occurrence of this kind of friction, it is possible to use a method of limiting the assembly direction of the radial roller bearing (cage 7a) (causing the continuous sections to come in contact with the guide surfaces), however, in that case, a problem occurs in that work efficiency when assembling the radial roller bearing is impaired.

Moreover, in the case of the cage 7a having construction as described above, when the dimension in the axial direction of the cage 7a is made small in order to assemble the cage 7a into a radial roller bearing having small dimensions in the axial direction (width dimension), there is a possibility that the following kind of problem will occur. In other words, the cage 7a is such that dimension in the axial direction and dimension in the radial direction of all of the fitting pieces 14a, 14b, 15a, 15b of the fitting section 13 are about half the dimension in the axial direction and dimension in the radial direction of the end sections 12a, 12b. Therefore, the area of the end surfaces in the circumferential direction of the fitting pieces 14a, 14b, 15a, 15b is about ¼ the area of the overall end surfaces 17a, 17b that face each other in the circumferential direction on both sides of the non-continuous section 11. Moreover, it becomes difficult for the size of all of the gaps that are formed between the end surfaces in the circumferential direction of the fitting pieces 14a, 14b, 15a, 15b, and opposing surfaces that face these end surfaces in the circumferential direction to match. The reason for this is that regulating the size of the gaps so that they are all the same requires very good injection molding performance and highly precise molds, which, together with being difficult from a manufacturing aspect, leads to a very large increase in manufacturing cost.

Therefore, when the end surfaces 17a, 17b come in contact (collide) in the circumferential direction during operation of the radial roller bearing in which the cage 7a is assembled, there is a possibility that only one of the end surfaces in the circumferential direction of the fitting pieces 14a, 14b, 15a, 15b and the opposing surface thereof will come in contact, and the contact surface area will be reduced. In this kind of case as well, by making the dimension in the axial direction of the cage 7a sufficiently large, it is possible to maintain the contact surface area and make it difficult for this problem to occur, however, as the dimension in the axial direction of the cage 7a become small, it become difficult to sufficiently maintain the contact surface area. Also, in a case such as this in which it is difficult to sufficiently maintain the contact surface area, when the end surfaces 17a, 17b come in contact with each other, the end surfaces 17a, 17b tilt and are not parallel with each other, so the rollers that are held near the end sections 12a, 12b become skewed. As a result, there is a possibility that the behavior of the cage 7a will become unstable. Moreover, moment loads that are applied to the cage become large, and there is a possibility that the cage 7a will elastically deform into a non-cylindrical shape, causing the behavior of the cage 7a to become unstable. Moreover, when skewing occurs, or when stress becomes concentrated in the areas of contact when the end surfaces 17a, 17b come in contact with each other, there is a possibility that the cage 7a will become damaged.

Furthermore, in the case of the cage 7a having a non-continuous section 11 in one locating in the circumferential direction as described above, there is a possibility that, due to handling error during assembly work, the width of the non-continuous section 11 will be excessively expanded in the circumferential direction. When the non-continuous section is excessively expanded in the circumferential direction in this way, there is a possibility that the cage 7a made of synthetic resin will whiten, or that the openings of the plurality of pockets will expand, and the rollers 6 that are held inside the pockets 10 will fall out.

As a cage that is able to avoid this situation, there is a cage 7b such as illustrated in FIG. 27A and disclosed in DE 4,222,175 (A1). In the case of this cage 7b, of the pair of rim sections 8c, 8d, cuts 18c, 18d are provided in portions where the phase in the circumferential direction is nearly same. Together with this, an elastic connecting section 19 is provided that spans between one end section in the circumferential direction of one rim section 8c (end section below the cut 18c in the figure) and the other end section in the circumferential direction of the other rim section 8d (end section above the cut 18d in the figure). The elastic connecting section 19 is thin compared to the rim sections 8c, 8d and the column sections 9.

This kind of elastic connecting section 19 is for allowing the inner-diameter dimensions of the cage 7b to expand elastically, and as illustrated in FIG. 27B, as the width of the cuts 18c, 18d expand in the circumferential direction, the elastic connecting section 19 elastically stretches. The amount that the elastic connecting section stretches is prevented from exceeding a limit, which prevents the width of the cuts 18c, 18d from expanding excessively. Together with this, the elastic restoration force that occurs in the elastic connecting section 19 acts to return the cuts 18c, 18d to the original width.

This kind of cage 7b can also prevent the occurrence of fretting wear in the outer-ring raceway and inner-ring raceway of the radial roller bearing. In a rotation support section in a manual transmission for an automobile such as illustrated in FIG. 28, the gears 20a, 20b of the automobile manual transmission are placed around a power transmission shaft 21 by way of radial roller bearings 1a, 1b and synchronization mechanisms 22a, 22b so as to be concentric with the power transmission shaft 21. When a transmission speed that corresponds to one of the gears 20a is selected, the gear 20a that corresponds to the selected transmission speed engages with the power transmission shaft 21 by way of a synchronization mechanism 22a, and rotates in synchronization with the power transmission shaft 21. On the other hand, the other gear 20b that does not correspond with the selected transmission speed is able to rotate relative to the power transmission shaft 21. The radial roller bearings 1a, 1b are provided to allow the relative rotation between the gear 20a or 20b that does not correspond with the selected transmission speed and the power transmission shaft 21.

Therefore, when a transmission speed that corresponds to one gear 20a is selected, the rollers 6a of the radial roller bearing 1a that is provided between the gear 20a that corresponds with the selected transmission speed and the power transmission shaft 21 do not roll and revolve (relative rotation against the gear 20a and the power transmission shaft 21) between the outer-ring raceway 3a, which is the inner circumferential surface of the gear 20a, and the inner-ring raceway 5a, which is the outer circumferential surface of the power transmission shaft 21. However, even in this state, due to vibration caused operation, or due to movement of the load zone and no-load zone as the gear 20a and power transmission shaft 21 rotates, the rollers 6a minutely displace (vibrate) in the circumferential direction of the gear 20a and power transmission shaft 21. This kind of vibration makes it easy for fretting wear to occur in the outer-ring raceway 3a and inner-ring raceway 5a.

In this kind of case as well, in this cage 7b, the elastic connecting section 19 is elastically stretched due to centrifugal force that is caused by the rotation, and this causes the diameter of the cage 7b to expand, or as the rotational speed decreases, the elastic connecting section 19 is elastically restored, which causes the diameter of the cage 7b to contract. Therefore, it is possible to cause the area of contact between the rolling surfaces of the rollers 6a and the outer-ring raceway 3a and inner-ring raceway 5a to move (fluctuate), which makes it possible to suppress fretting wear.

However, also in the case of the cage 7b having this kind of construction, there is the possibility that the following problems will occur. In other words, with the elastic connecting section 19 spanning between one end section in the circumferential direction of one rim section 8c and the other end section in the circumferential direction of the other rim section 8d, there is only one connecting section, so depending on the operating conditions, there is a possibility that the elastic force of the elastic connecting section 19 will not be sufficient. Moreover, during operation, when expanding or contracting the diameter of the cage 7b, the elastic connecting section 19 applies a moment to the one end section in the circumferential direction of one rim section 8c and the other end section in the circumferential direction of the other rim section 8d, and these portions are pushed or pulled in opposite directions in the axial direction from each other. As a result, the side surface in the axial direction of one end section in the circumferential direction and the side surface in the axial direction of the other end section in the circumferential direction of the rim sections 8c, 8d (the side surfaces in the axial direction of the portions on both sides of the cuts 18c, 18d) are no longer on the same plane. Therefore, there is a possibility that the side surfaces in the axial direction of the rim sections 8c, 8d will become inclined with respect to the guide surfaces for guiding these side surfaces in the axial direction (virtual planes that are orthogonal to the center axis of the cage 7b).

Moreover, in the case of this cage 7b, due to having a small thickness, the strength of the elastic connecting section 19 is low compared to the other portions, so the cooling contraction of this elastic connecting section 19 is large compared to the other portion, and irregular cooling easily occurs. Therefore, there is a possibility that the distance between the portions that are connected by the elastic connecting section 19 (one end section in the circumferential direction of one rim section 8c and the other end section in the circumferential direction of the other rim section 8d) may be less than a desired value. In the initial state as well, there is a possibility that the side surfaces in the axial direction of the rim sections 8c, 8d will be inclined with respect to the guide surfaces provided on the opposing members. Furthermore, of the cage 7b, it becomes easy for the rollers that are held in the pockets that are located near both end sections on both sides of the cuts 18c, 18d to become skewed. As a result, there is a possibility that the behavior of the cage 7b will become unstable.

RELATED LITERATURE

Patent Literature

[Patent Literature 1] JP 2-089814 (A)
[Patent Literature 2] GB 1,352,909 (A)
[Patent Literature 3] DE 4,222,175 (A1)

SUMMARY OF THE INVENTION

Problem to be Solved by the Invention

In consideration of the situation above, the object of the present invention is to achieve a cage for a radial roller bearing that can be made by axial draw molding, and that can suppress wear due to friction between the end sections in the axial direction and the guide surfaces of the opposing members, without the assembly direction being restricted.

Moreover, an object of the present invention is to achieve a cage for a radial roller bearing that, as necessary, has good assembly characteristics, and is capable of stable behavior during operation even when the dimension in the axial direction is small.

Furthermore, an object of the present invention is to achieve a cage for a radial roller bearing that, as necessary, has good assembly characteristics, and together with being able to prevent fretting wear, is able to display sufficient elastic force in the elastic connecting section, and has stable behavior during operation.

Means for Solving the Problems

The cage for a radial roller bearing of the present invention is made by axial draw molding of synthetic resin that uses an axial draw mold comprising a pair of split molds, and has a pair of rim sections, a plurality of column sections, and a plurality of pockets.

The pair of rim sections are circular ring shaped and are concentric with each other, being separated by an interval in the axial direction. Moreover, the column sections are intermittently provided in the circumferential direction and span between the rim sections. Furthermore, the pockets are provided in portions that are surrounded on four sides by the rim sections and column sections that are adjacent in the circumferential direction.

A feature of the cage for a radial roller bearing of the present invention is the shape of the rim sections. In other words, in each of the rim sections, outer-diameter side concave sections that are recessed inward in the radial direction are provided at a plurality of locations on the outer circumferential surfaces of the rim sections in portions that are aligned in the axial direction with the pockets. Moreover, inner-diameter side concave sections that are recessed outward in the radial direction are provided at a plurality of locations on the inner circumferential surfaces of the rim sections in portions that are aligned in the axial direction with the pockets and that have a phase in the circumferential direction that is different than that of the outer-diameter side concave sections.

Moreover, the phases in the circumferential direction of the outer-diameter side concave sections and the inner-diameter side concave sections differ between one rim section and the other rim section of the rim sections, and the outer-diameter concave sections and inner-diameter concave sections are arranged one at a time in portions of the rim sections that are located on both side in the axial direction of the pockets.

In each of the rim sections, the outer-diameter side concave sections and inner-diameter side concave sections are provided so as to alternate with each other one at a time or several at a time in the circumferential direction. In this case, the outer-diameter side concave sections and inner-diameter side concave sections are provided so as to alternate with each other by the same number in the circumferential direction.

Moreover, each of the rim sections is an incomplete ring shape having a cut in one location in the circumferential direction, and by expanding the width of the cuts in the circumferential direction, it is possible to elastically expand the diameter of the rim sections. In this case, in the one rim section and the other rim section, the phases of these cuts virtually coincide in the circumferential direction.

Alternatively, each of the rim sections can be formed by combining a plurality of arc shaped divided parts into a circular ring shape.

When the rim sections are formed into incomplete ring shapes, an elastic connecting section that can elastically deform (stretch or contract) in the circumferential direction is provided so as to span between end sections of the rim sections and the plurality of column sections on both sides of the position of the cuts that can move apart from or toward each other in the circumferential direction.

Alternatively, a fitting section can be provided between end sections of the rim sections and the column sections on both sides of location of the cut that are able to move apart from or toward each other in the circumferential direction, and this fitting section engages these end sections so as not to allow relative displacement of the end sections at least with regard to the axial direction or with regard to both the axial direction and radial direction.

Moreover, in the case of providing an elastic connecting section, one end section of both end sections in the circumferential direction on both sides of the cut in one rim section that face each other, and the end section on the opposite side in the circumferential direction for the one end section of both end sections in the circumferential direction on both sides of the cut in the other rim section that face each other can be connected together by the elastic connecting section.

Alternatively, both end sections in the circumferential direction on both sides of the cut in one rim section that face each other can be connected together by the elastic connecting section. This elastic connecting section can also be provided in the other rim section, or can be provided in both the one rim section and the other rim section.

Furthermore, the elastic connecting section can be composed of an outer-diameter side elastic connecting section and an inner-diameter side elastic connecting section that are capable of elastically deforming in the circumferential direction, and the outer-diameter side elastic connecting section and the inner-diameter side elastic connecting section overlap each other in the radial direction. In this case, the outer-diameter side elastic connecting section and the inner-diameter side elastic connecting section have shapes that are inverted with respect to each other in the axial direction of the cage for a radial roller bearing.

When the elastic connecting section is composed of an outer-diameter side elastic connecting section and an inner-diameter side elastic connecting section, the outer-diameter side elastic connecting section and the inner-diameter side elastic connecting section can have a linear shape and cross in the center portion in the axial direction of the cage for a radial roller bearing. In this case, one end section in the circumferential direction of the outer-diameter side elastic connecting section is connected to a portion on one side in the axial direction of a portion on the outer-diameter side of one end section of both end sections that are provided on both sides of the cut, and the other end section in the circumferential direction of the outer-diameter side elastic connecting section is connected to a portion on the other side in the axial direction of a portion on the outer-diameter side of the other end section of both end sections that are provided on both sides of the cut. Moreover, one end section in the circumferential direction of the inner-diameter side elastic connecting section is connected to a portion on the other side in the axial direction of a portion on the inner-diameter side of the one end section, and the other end section in the circumferential direction of the inner-diameter side elastic connecting section is connected to a portion on one side in the axial direction of a portion on the inner-diameter side of the other end section.

Alternatively, the outer-diameter side elastic connecting section and the inner-diameter side elastic connecting section can each have a V shape. In this case, one end section in the circumferential direction of the outer-diameter side elastic connecting section connects to a portion on one side in the axial direction of a portion on the outer-diameter side of one end section of both end sections that are provided on both sides of the cut, and the other end section in the circumferential direction of the outer-diameter side elastic connecting section connects to a portion on one side in the axial direction of a portion on the outer diameter side of the other end section of both end sections that are provided on both sides of the cut. Moreover, one end section in the circumferential direction of the inner-diameter side elastic connecting section connects to a portion on the other side in the axial direction of a portion on the inner-diameter side of the one end section, and the other end section in the circumferential direction of the inner-diameter side elastic connecting section connects to a portion on the other side in the axial direction of a portion on the inner-diameter side of the other end section.

In the case of providing a fitting section, the fitting section can be composed of a total of two sets of outer-diameter side fitting pieces and inner-diameter side fitting pieces, with one set each being formed on the end sections that are provided on both sides of the cut. Therefore, an outer-diameter side fitting piece is provided in a portion of one side in the axial direction of a portion on the outer diameter side of one end section of the end sections that are provided on both sides of the cut, and is provided in a state so as to extend in the circumferential direction toward the other end section, and an inner-diameter side fitting piece is provided on a portion of the other side in the axial direction of a portion on the inner-diameter side of the one end section, and is provided in a state so as to extend in the circumferential direction toward the one end section. On the other hand, an outer-diameter side fitting piece is provided on a portion on the other side in the axial direction of a portion on the outer-diameter side of the other end section, and is provided so as to extend in the circumferential direction toward the one end section, and an inner-diameter side fitting piece is provided on a portion on one side in the axial direction of a portion on the inner-diameter side of the other end section, and is provided so as to extend in the circumferential direction toward the one end section.

Together with the outer-diameter side fitting pieces and the inner-diameter side fitting pieces fitting together in the axial direction in portions on the outer-diameter side and portions on the inner-diameter side of the fitting section, the outer-diameter side fitting pieces and the inner-diameter side fitting pieces fit together in the radial direction in portions on one side in the axial direction and portions on the other side in the axial direction of the fitting section.

In this case, the dimensions in the axial direction are different from each other between the outer-diameter side fitting pieces and also between the inner-diameter side fitting pieces. The gap between the end surface in the circumferential direction of the outer-diameter side fitting piece having the larger dimension in the axial direction of the outer-diameter side fitting pieces and the opposing surface that faces that end surface in the circumferential direction is less than the gap between the end surface in the circumferential direction of the outer-diameter side fitting piece having the smaller dimension in the axial direction of the outer-diameter side fitting sections and the opposing surface that faces that surface in the circumferential direction. Moreover, the gap between the end surface in the circumferential direction of the inner-diameter side fitting piece having the larger dimension in the axial direction of the inner-diameter side fitting pieces and the opposing surface that faces that end surface in the circumferential direction is less than the gap between the end surface in the circumferential direction of the inner-diameter fitting piece having the smaller dimension in the axial direction of the inner-diameter side fitting pieces and the opposing surface that faces that end surface in the circumferential direction.

In this case, preferably the gap between the end surface in the circumferential direction of the outer-diameter side fitting piece having the larger dimension in the axial direction and the opposing surface that faces that end surface in the circumferential direction is the same as the gap between the end surface in the circumferential direction of the inner-diameter side fitting piece having the larger dimension in the axial direction and the opposing surface that faces that end surface in the circumferential direction.

Moreover, it is possible to form insertion spaces in portions on both sides of the fitting section by offsetting the end sections in the axial direction of the fitting section further toward the center side in the axial direction than the rim sections.

Furthermore, it is possible to form tapered surfaces on the side surfaces in the axial direction of the end sections on both side of the cuts that are capable of moving away from and closer to each other in the circumferential direction, and these tapered surfaces are inclined in a direction such that the dimension in the axial direction of the end sections becomes smaller going toward the cut.

Effect of the Invention

The cage for a radial roller bearing of the present invention is made by axial draw molding, and together with being able to make the surface shapes and the surface areas of the end surfaces in the axial direction (side surfaces in the axial direction of the pair of rim sections) the same, it is possible to make the surface shapes of the outer-diameter side portion and inner-diameter side portion of the end surfaces in the axial direction the same. Therefore, even in the case of construction in which guide surfaces that are provided on opposing members such as the rotating shaft around which the radial roller bearing is assembled are not able to support the end surfaces in the axial direction of the cage for a radial roller bearing over the entire area, it is possible to bring the end surfaces in the axial direction in contact with the guide surfaces over a sufficient surface area. Consequently, it is possible to suppress wear due to friction between the end surfaces in the axial direction and the guide surfaces without the assembly direction being limited.

When the cage for a radial roller bearing constructed as described above that is made using a synthetic resin and is constructed so as to have a non-continuous section that includes a cut at one location in the circumferential direction, by causing the cage for a radial roller bearing to elastically deform, it is possible to expand the width of the non-continuous section in the circumferential direction. Therefore, it is possible to easily assemble the cage for a radial roller bearing around a shaft, such as a rotating shaft around which the cage for a radial roller bearing is assembled, even when there is an obstacle such as an outward facing flange shaped protrusion on the outer circumferential surface of the shaft.

Furthermore, in the cage for a radial roller bearing that is constructed as described above, when an elastic connecting section that connects the end sections in the circumferential direction that face each other on both sides of the non-continuous section, by causing this elastic connecting section to stretch in the circumferential direction, it is possible to expand the width of the cut in the circumferential direction. Therefore, not only it is possible to improve the assembly characteristics, by the elastic connecting section stretching or elastically being restored according to the rotational speed (size of the centrifugal force that acts) when the cage for a radial roller bearing is rotated, it is possible to change the contact position between the rolling surfaces of the rollers and the outer-ring raceway and inner-ring raceway, so it is possible to effectively prevent fretting wear.

In the case of construction in which the elastic connecting section is composed of an outer-diameter side elastic connecting section and an inner-diameter side elastic connecting section, and the outer-diameter side elastic connecting section and the inner-diameter side elastic connecting section are shaped so as to be inverted with respect to each other and overlap each other in the radial direction, it is possible to not only improve the assembly characteristics and prevent fretting wear, but it is also possible to obtain the effect of displaying sufficient strength in the elastic connecting section and stabilizing the behavior of the cage for a radial roller bearing during operation.

Furthermore, there is no interference in the axial direction between the outer-diameter side elastic connecting section and the inner-diameter side elastic connecting section, so the overall length (length in the axial direction) of outer-diameter side elastic connecting section and the inner-diameter side elastic connecting section can be made to be sufficiently large within the range of the dimension in the axial direction (overall width) of the cage for a radial roller bearing, and thus it is possible to sufficiently increase elastic force (spring force) that can be obtained by the outer-diameter side elastic connecting section and the inner-diameter side elastic connecting section. Moreover, the outer-diameter side elastic connecting section and the inner-diameter side elastic connecting section are arranged so as to overlap in the radial direction, so there is no increase in the formation space (space in the circumferential direction) of the elastic connecting section. Therefore, it is possible to obtain sufficient elastic force in the elastic connecting section even when the formation space for the elastic connecting section is small.

In addition, the outer-diameter side elastic connecting section and the inner-diameter side elastic connecting section are formed so as to be inverted with respect to each other in the axial direction, so during operation, when the diameter of the cage for a radial roller bearing expands or contracts, it is possible to cancel out the forces acting in the axial direction on both end sections that are provided on both sides of the cut from the outer-diameter side elastic connecting section and the inner-diameter side elastic connecting section. Moreover, it is possible to keep the amount of contraction of the outer-diameter side elastic connecting section and the inner-diameter side elastic connecting section the same even when the amount that the outer-diameter side elastic connecting section and the inner-diameter side elastic connecting section cool and contract is greater than other areas. Therefore, it is possible to keep the outer-diameter side elastic connecting section and the inner-diameter side elastic connecting section from shifting from being on the same plane, and it is possible to prevent the side surface in the axial direction of the rim sections from becoming inclined with respect to the guide surfaces. Moreover, it is possible to effectively prevent skewing of the rollers that are held in the pockets that are located near both end sections that are provided on both sides of the cut. Therefore, it is possible to stabilize the behavior during operation.

On the other hand, in the cage for a radial roller bearing constructed as described above, it is also possible to employ construction in which in the non-continuous section, one set each of a total of two sets of outer-diameter side fitting pieces and inner-diameter side fitting pieces is formed on each end section and located between the end sections in the circumferential direction on both sides of the non-continuous section that face each other. In this case, particularly, by differentiating the dimensions in the axial direction from each other between the outer-diameter side fitting pieces and also between the inner-diameter side fitting pieces, and by making the gaps between the end surfaces in the circumferential direction of the fitting pieces having the larger dimension in the axial direction and the opposing surfaces less than the gap between the end surfaces in the circumferential direction of the fitting pieces having the smaller dimension in the axial direction and the opposing surfaces on both the outer diameter side and the inner diameter side, the assembly characteristics is allowed to be good, and it is possible to stabilize the behavior during use even when the dimension in the axial direction of the cage for a radial roller bearing is small.

Moreover, during operation, when the end sections on both sides of the non-continuous section come in contact, it is possible to cause the end surfaces in the circumferential direction of the fitting sections having the larger dimension in the axial direction to come in contact with the opposing surfaces. Therefore, it is possible to maintain sufficient contact area when both end surfaces come in contact, even when the dimension in the axial direction of the cage for a radial roller bearing is small. As a result, it is possible to effectively prevent the behavior of the cage for a radial roller bearing from becoming unstable.

BRIEF DESCRIPTION OF THE DRAWINGS

FIG. 27A illustrates the free state (complete state), and FIG. 27B illustrates the elastically stretched state in the circumferential direction of an elastic connecting section.

MODES FOR CARRYING OUT THE INVENTION

In the following, the cage for a radial roller bearing of the present invention will be explained with reference to the accompanying drawings. The radial roller bearing in which the cage for a radial roller bearing of the present invention is assembled has: an outer-diameter side member (outer ring or housing that does not rotate during operation, or a gear or roller that rotates during operation) that has a cylindrical shaped outer-ring raceway around the inner circumferential surface; an inner-diameter side member (inner ring or rotating shaft that rotates during operation, or a support shaft that does not rotate during operation) that has a cylindrical shaped inner-ring raceway that is formed around the outer circumferential surface thereof; and a plurality of rollers (including needle rollers) that are provided between the outer-ring raceway and inner-ring raceway so as to be able to roll freely. The size of the radial roller bearing, whether or not there is an inner ring, and the size (diameter and length) and number of rollers, and the like can be arbitrarily set according to the operating conditions and purpose of use.

The plurality of rollers of the radial roller bearing are held inside pockets so as to be able to roll freely by a cage for a radial roller bearing in order to prevent an increase in rotational resistance and the occurrence of burning due to friction that is caused by contact between adjacent rollers in the circumferential direction while rolling between the outer-ring raceway and inner-ring raceway. In order to more effectively prevent this kind of increase in rotational resistance and the occurrence of burning, it is possible to perform lubrication using an oil lubricant or grease lubricant. Moreover, the cage for radial roller bearing can employ any guide method from among a rolling body guide (roller guide), outer-ring guide, and inner-ring guide.

First Example and Second Example

Figure 1:
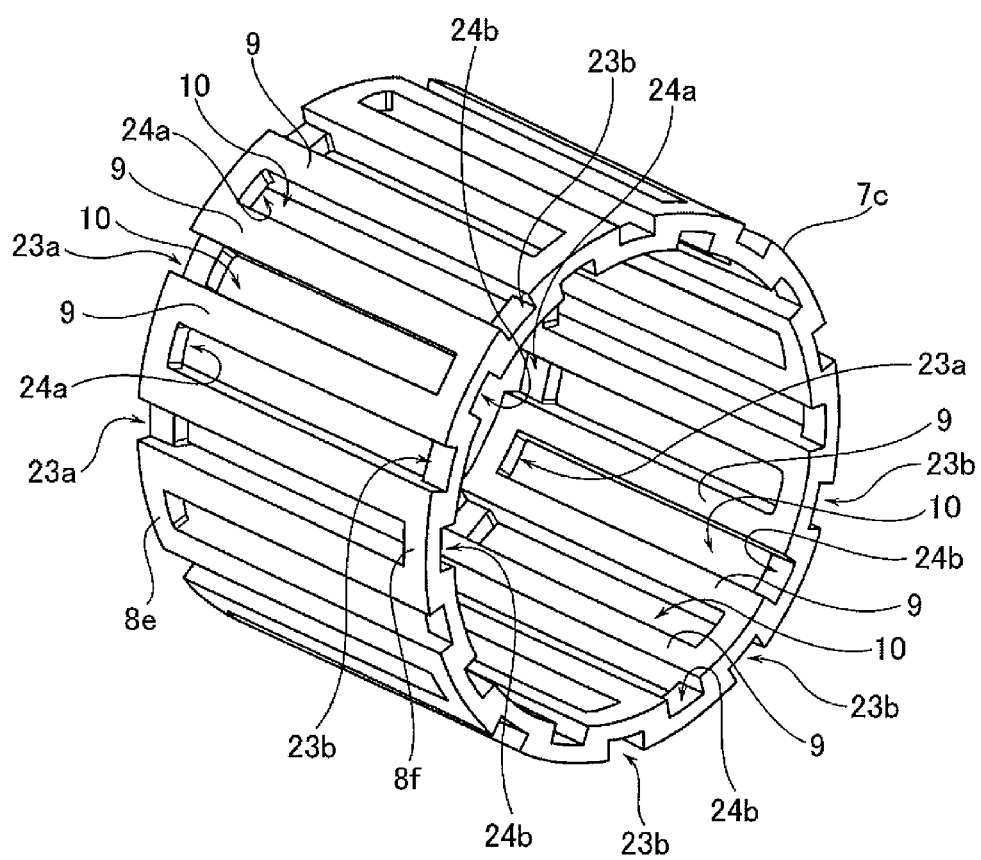
FIG. 1 is a perspective view illustrating the overall construction of a cage for a radial roller bearing of a first example of an embodiment of the present invention.
Figure 2:
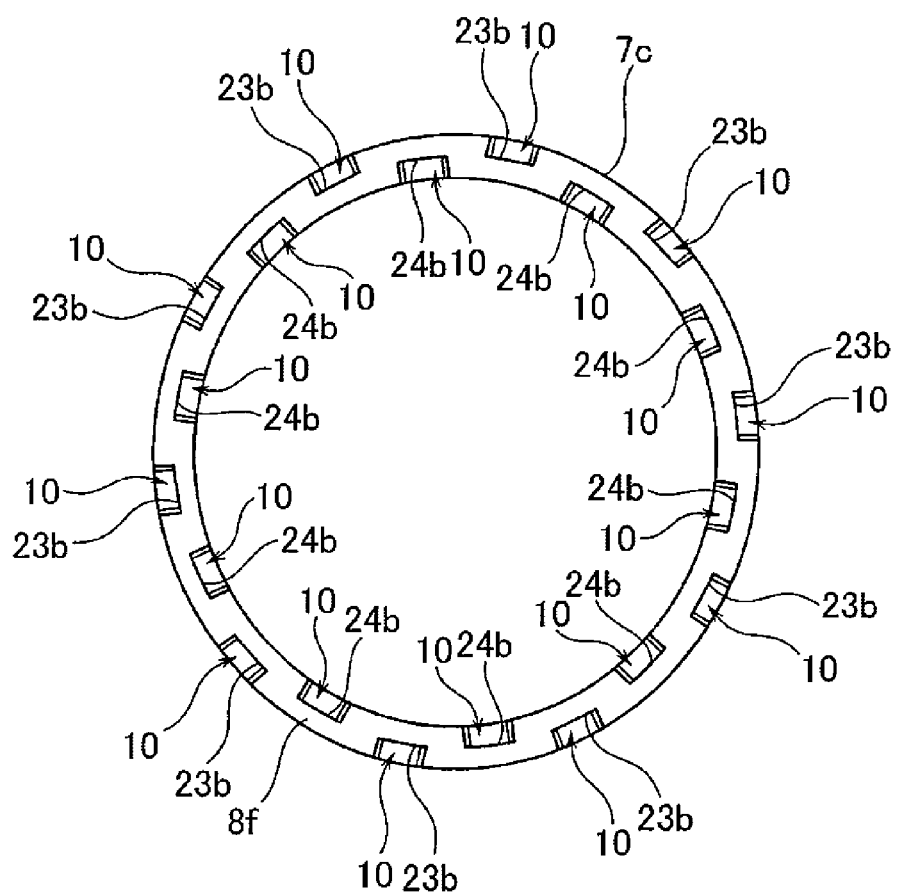
FIG. 2 is a top view illustrating the end surface in the axial direction of the cage for a radial roller bearing of the first example.

FIG. 1 and FIG. 2 illustrate a cage 7c for a radial roller bearing (hereafter, referred to as simply a "cage") of a first example of an embodiment of the present invention. In this example, the case is explained in which the entire cage 7c (rim sections 8e, 8f and column sections 9) is integrally formed using synthetic resin by axial draw molding that uses a pair of split molds. In other words, the case of making the entire cage 7c by axial draw molding in which synthetic resin that is the same as that used in the case of a typical cage made using synthetic resin, such as polyamide resin, polyphenylene sulfide resin, or these resins mixed with fibers for reinforcement, is injected into the cavity of a mold (axial draw mold) that is composed of a pair of split molds (not illustrated in the figure), after which, both split molds are pulled apart in the axial direction. However, after injection molding, the cage 7c can be finished by separately performing a cutting and grinding process.

The cage 7c has a pair of rim sections 8e, 8f that are separated in the axial direction and arranged so as to be concentric with each other, and a plurality of column sections 9 that are intermittently located in the circumferential direction and span between both rim sections 8e, 8f. The portions that are surround on four sides by column sections 9 that are adjacent in the circumferential direction and the rim sections 8e, 8f are pockets 10 for holding the rollers (not illustrated in the figure) so as to roll freely, with one roller in each pocket 10. Moreover, the cage 7c is constructed such that the columns 9 and pockets 10 are arranged so as to alternate in the circumferential direction, and one roller is inserted inside each pocket 10 so that these rollers are arranged in the circumferential direction at uniform intervals (uniform pitch).

The size of the pockets 10 can be set according to the diameter and length of the rollers so that the rollers can be held so as to be able to roll freely. Moreover, the number of pockets 10 can be arbitrarily set according to the capacity (number of rollers) of the radial roller bearing in which the cage 7c is assembled. The shape of the inner surfaces (surfaces that come in contact with the outer circumferential surfaces of the rollers) of the pockets 10 can be concave curved surfaces have a radius of curvature that is a little less than the radius of curvature of the outer circumferential surface of the rollers, and can be straight surfaces. Furthermore, in order to prevent the rollers from falling out, protrusions (tab shaped protrusion that hold the rollers) that reduce the width of the openings of the pockets 10 can be provided on the edge sections of the openings of the pockets 10. The dimension of the diameter and the interval in the axial direction of the rim sections 8e, 8f can be arbitrarily set according to the size of the radial roller bearing.

Together with outer-diameter side concave sections 23a, 23b that are recessed inward in the radial direction being provided at a plurality of locations on the outer circumferential surface of the rim sections 8e, 8f that are aligned in the axial direction with the pockets 10, inner-diameter side concave sections 24a, 24b that are recessed outward in the radial direction are provided at a plurality of locations in the circumferential direction having a different phase than the outer-diameter side concave sections 23a, 23b. In other words, the outer circumferential surfaces of the rim sections 8e, 8f are continuous in an uneven shape by the outer-diameter side concave sections 23a, 23b and remaining sections (continuous sections with the outer circumferential surface of the column sections 9), and the inner circumferential surface of the rim sections 8e, 8f are continuous in an uneven shape by the inner-diameter side concave sections 24a, 24b and remaining sections (continuous sections with the inner circumferential surface of the column sections 9). Moreover, in one rim section 8e and the other rim section 8f, the phase in the circumferential direction of the outer-diameter side concave sections 23a, 23b and the inner-diameter side concave sections 24a, 24b differs, so in the same phase in the circumferential direction of the outer circumferential surface and inner circumferential surface of the rim sections 8e, 8f, the outer-diameter side concave sections 23a, 23b and the inner-diameter side concave sections 24a, 24b do not overlap in the radial direction. Particularly, in the case of the construction illustrated in FIG. 1, the outer-diameter side concave sections 23a and the inner-diameter side concave sections 24a are alternately provided one at a time in the circumferential direction in one rim section 8e, and the outer-diameter side concave sections 23b and inner-diameter side concave sections 24b are alternately provided one at a time in the circumferential direction in the other rim section 8f.

Moreover, between the one rim section 8e and the other rim section 8f, the phase in the circumferential direction of the outer-diameter side concave sections 23a, 23b and the inner-diameter side concave sections 24a, 24b differ. In other words, the phase in the circumferential direction of the outer-diameter side concave sections 23a that are provided in the one rim section 8e differ from that of the outer-diameter concave sections 23b that are provided in the other rim section 8f, and the phase in the circumferential direction of the inner-diameter side concave sections 24a that are provided in the one rim section 8e differs from that of the inner-diameter side concave sections 24b that are provided in the other rim section 8f. As a result, one each of an outer-diameter side concave section 23a, 23b and inner-diameter side concave section 24a, 24b are located in the portions of the rim sections 8e, 8f that are located on both sides in the axial direction of the pockets 10. Moreover, the width dimension in the circumferential direction of the outer-diameter side concave sections 23a, 23b and the inner-diameter side concave sections 24a, 24b is the same as the width dimension in the circumferential direction of the pockets 10, and the depth dimension in the radial direction is half the thickness dimension in the radial direction of the rim sections 8e, 8f. The outer-diameter side concave sections 23a, 23b and the inner-diameter side concave sections 24a, 24b as described above are such that when a pair of split molds are moved in the axial direction when performing axial draw molding, the concave sections allow the portions of the split molds that are provided for forming the pockets 10 to pass in the axial direction.

FIG. 1 illustrates construction in which as described above, outer-diameter side concave sections 23a, 23b and inner-diameter side concave sections 24a, 24b are alternately provided one at a time in the circumferential direction in the rim sections 8e, 8f. On the other hand, as a second example of an embodiment of the present invention, FIG. 3 illustrates construction in which outer-diameter side concave sections 23a, 23b and inner-diameter side concave sections 24a, 24b are alternately provided two at a time in the circumferential direction in the rim sections 8e, 8f.

Figure 3:
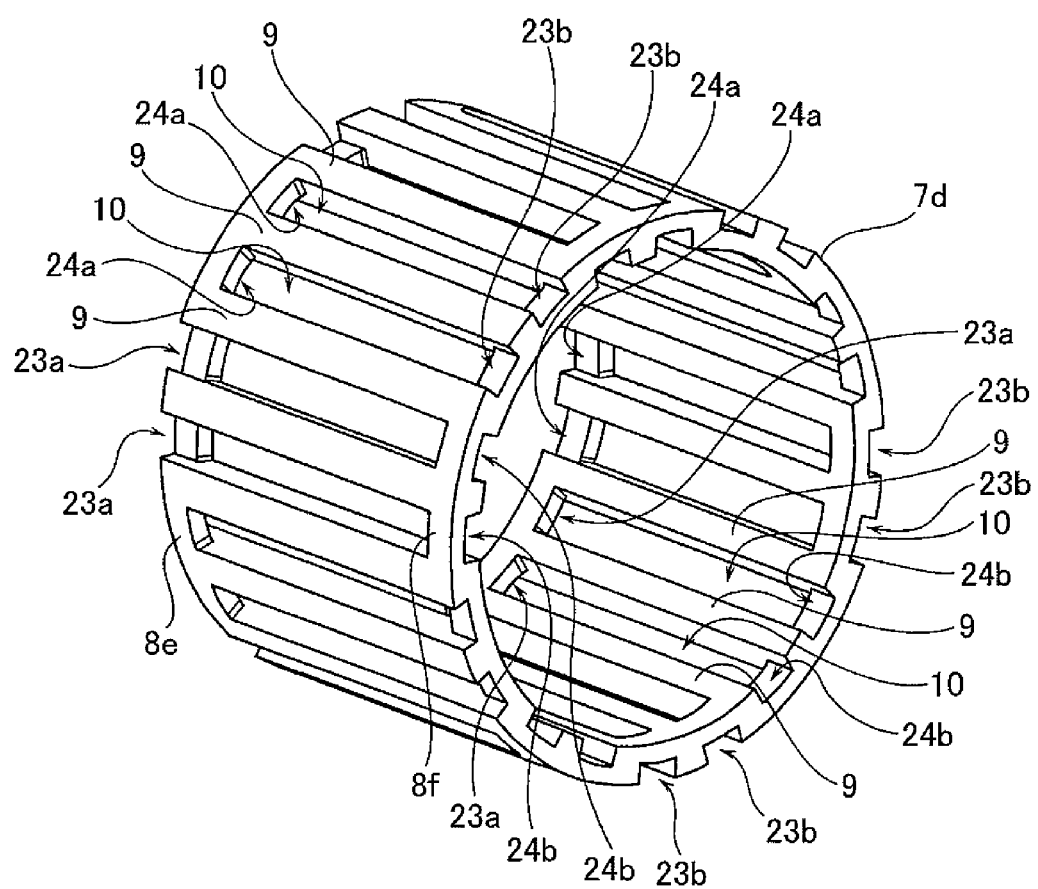
FIG. 3 is a perspective drawing illustrating the overall construction of a cage for a radial roller bearing of a second example of an embodiment of the present invention.

In the first example of an embodiment illustrated in FIG. 1 and the second example of an embodiment illustrated in FIG. 3, construction is such that the same number of outer-diameter side concave sections 23a, 23b (and inner-diameter side concave sections 24a, 24b) are arranged in the rim sections 8e, 8f at a set interval (pitch) of the same number one or two pockets 10 at a time. However, it is also possible to arrange the same number of outer-diameter side concave sections 23a, 23b (and inner-diameter side concave sections 24a, 24b) at different intervals of the same number each, or to arrange the same number of outer-diameter side concave sections 23a, 23b (and inner-diameter side concave sections 24a, 24b) at the same intervals of a different number each. Furthermore, it is possible to arrange a different number of outer-diameter side concave sections 23a, 23b (and inner-diameter side concave sections 24a, 24b) at the same intervals or different intervals of the same number or different number each. For example, it is possible to employ construction in which the outer-diameter side concave sections 23a, 23b and inner-diameter side concave sections 24a, 24b are alternately provided in the circumferential direction in the rim sections 8e, 8f alternating one at a time, or two at a time. Moreover, it is also possible to employ construction in which the outer-diameter side concave sections 23a, 23b and inner-diameter side concave sections 24a, 24b are alternately provided three at a time in the circumferential direction in the rim sections 8e, 8f. Alternatively, it is possible to make the number of outer-diameter side concave sections 23a of one rim section 8e and the number of outer-diameter concave sections 23b of the other rim section 8f, and the number of inner-diameter concave sections 24a of the one rim section 8e and the number of inner-diameter side concave sections 24b of the other rim section 8f different.

In short, the number and arrangement of the outer-diameter concave sections 23a, 23b and the inner-diameter side concave sections 24a, 24b can be arbitrarily set according to the number of pockets 10 in the cage 7c, 7d and the shape of the guide surfaces for guiding the end surfaces in the axial direction of the cage 7c, 7d.

In the first example of an embodiment illustrated in FIG. 1 and in the second example of an embodiment illustrated in FIG. 3, together with providing outer-diameter side concave sections 23a, 23b having the same size and same shape in the rim sections 8e, 8f, inner-diameter side concave sections 24a, 24b having the same size and same shape are provided. However, the size and shape of the outer-diameter side concave sections 23a, 23b and the inner-diameter side concave sections 24a, 24b can be different for each outer-diameter side concave section 23a, 23b and each inner-diameter side concave section 24a, 24b, or can be different for the outer-diameter side concave sections 23a, 23b and inner-diameter side concave sections 24a, 24b.

The outer-diameter side concave sections 23a, 23b and inner-diameter side concave sections 24a, 24b are formed by arranging part of the split molds during injection molding, and function for allowing the portion of the split molds that form the pockets 10 to pass, so the sum of the depth dimension in the radial direction of a set of outer-diameter side concave section 23a and inner-diameter side concave section 24b (or a set of outer-diameter side concave section 23b and inner-diameter side concave section 24a) that are provided on both sides in the axial direction of a pocket 10 is the same as the thickness dimension in the radial direction of the rim sections 8e, 8f.

In construction as described above, the cage 7c, 7d of a first example and second example of an embodiment can be made by axial draw molding, and together with being able to make the shape of the surfaces (surface areas) of both end surfaces in the axial direction virtually the same, it is possible to made the shape of the surfaces of the outer-diameter side portions and inner-diameter side portions of the end surfaces virtually the same. In other words, in this example, together with uniformly arranging the outer-diameter side concave sections 23a, 23b and the inner-diameter side concave sections 24a, 24b in the pair of rim sections 8e, 8f, the outer-diameter side concave sections 23a, 23b and the inner-diameter side concave sections 24a, 24b are arranged uniformly on the outer-diameter side and inner-diameter side of the rim sections 8e, 8f. As a result, together with being able to make the surface shapes (surface areas) of the side surfaces in the axial direction of one rim section 8e and the side surfaces in the axial direction of the other rim section 8f virtually the same, it is possible to make the surface shapes of the outer-diameter side portions and the inner-diameter side portions of the side surfaces in the axial direction of each of the rim section 8e and rim section 8f virtually the same. Therefore, even in the case of construction in which it is not possible for the guide surfaces that are provided in opposing members such as the rotating shaft around which the radial roller bearing is assembled to support the entire area of the end surfaces in the axial direction of the cage for a radial roller bearing (for example, supports only the side surfaces on the outer-diameter side, or supports only the side surfaces on the inner-diameter side), it is possible to bring the end surfaces in the axial direction of the cage 7c, 7d in contact with the guide surfaces over a sufficient contact area. Therefore, it is possible to effectively prevent wear due to friction between the end surfaces in the axial direction and the guide surfaces without the assembly direction being restricted.

In the case of the cage 7c, 7d of the first example and second example of an embodiment, the pair of rim sections 8e, 8f are constructed so as to have a circular ring shape that is continuous in the circumferential direction, however, the pair of rim sections can also be constructed so as to have an incomplete circular ring shape (C shape) that has a cut in one location in the circumferential direction. In the case of employing this kind of construction as well, it is possible to obtain the same effect as in the case of the cage 7c, 7d of the first example and second example of an embodiment in that it is possible to sufficiently maintain contact area with the guide surfaces that are provided on the opposing members, and prevent wear of the end surfaces in the axial direction.

Third Example, Fourth Example, Fifth Example, Sixth Example and Seventh Example

Figure 4:
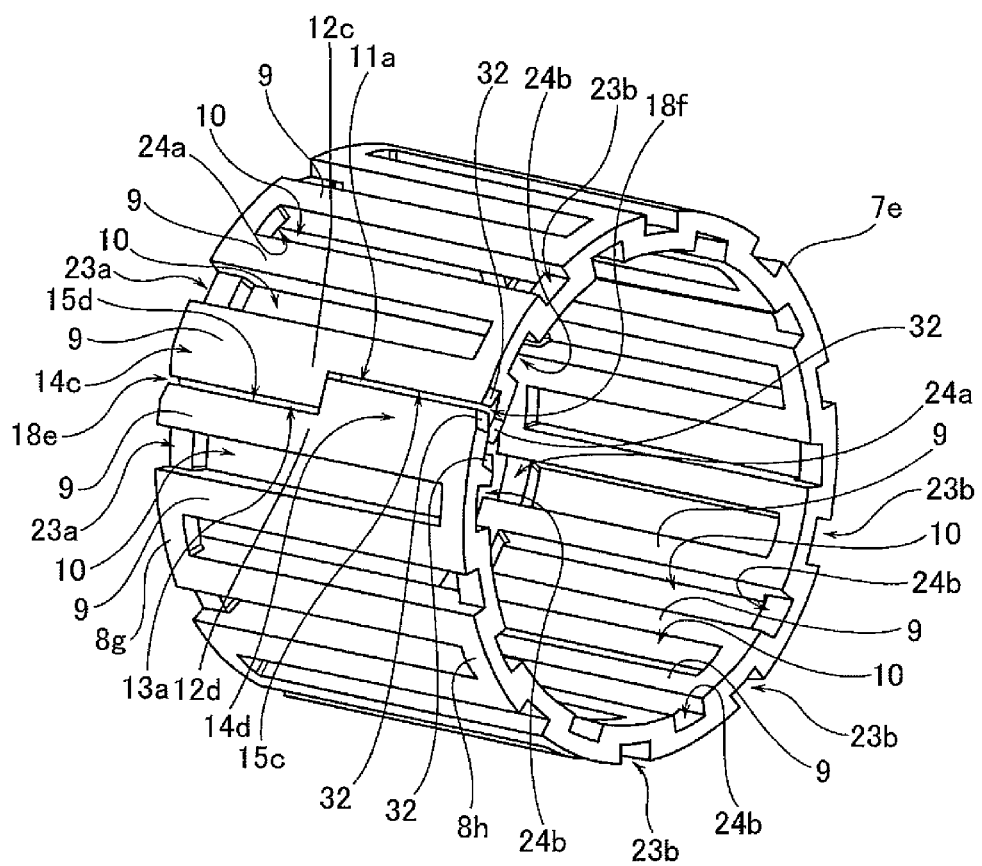
FIG. 4 is a perspective drawing illustrating the overall construction of a cage for a radial roller bearing of a third example of an embodiment of the present invention, and is as seen from the outside in the radial direction of the fitting section.
Figure 5:
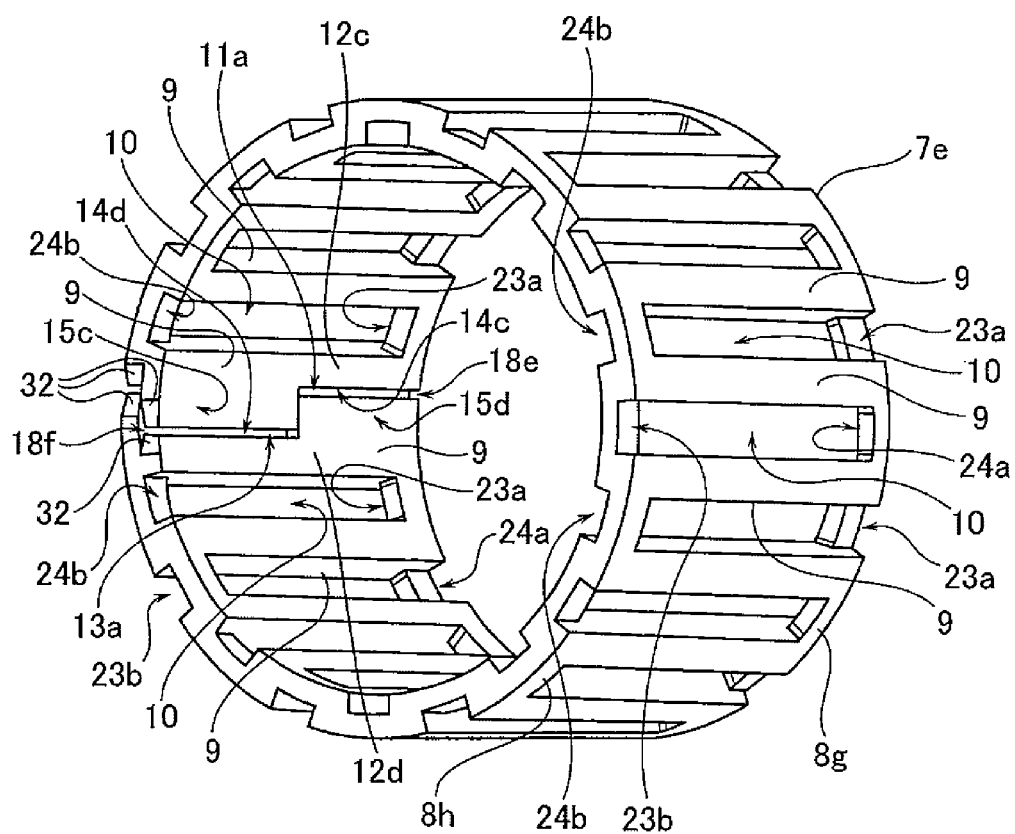
FIG. 5 is a perspective drawing illustrating the overall construction of the cage for a radial roller bearing of the third example, and is as seen from the inside in the radial direction of the fitting section.
Figure 6:
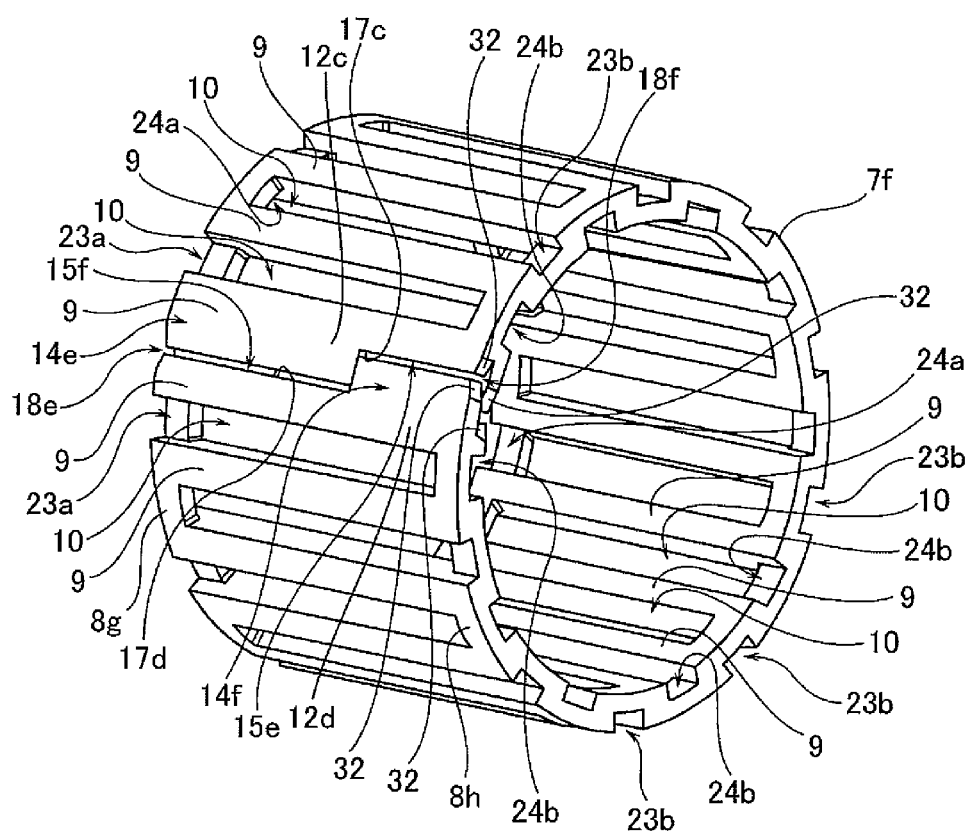
FIG. 6 is a perspective drawing illustrating the overall construction of a cage for a radial roller bearing of a fourth example of an embodiment of the present invention, and is as seen from the outside in the radial direction of the fitting section.
Figure 7:
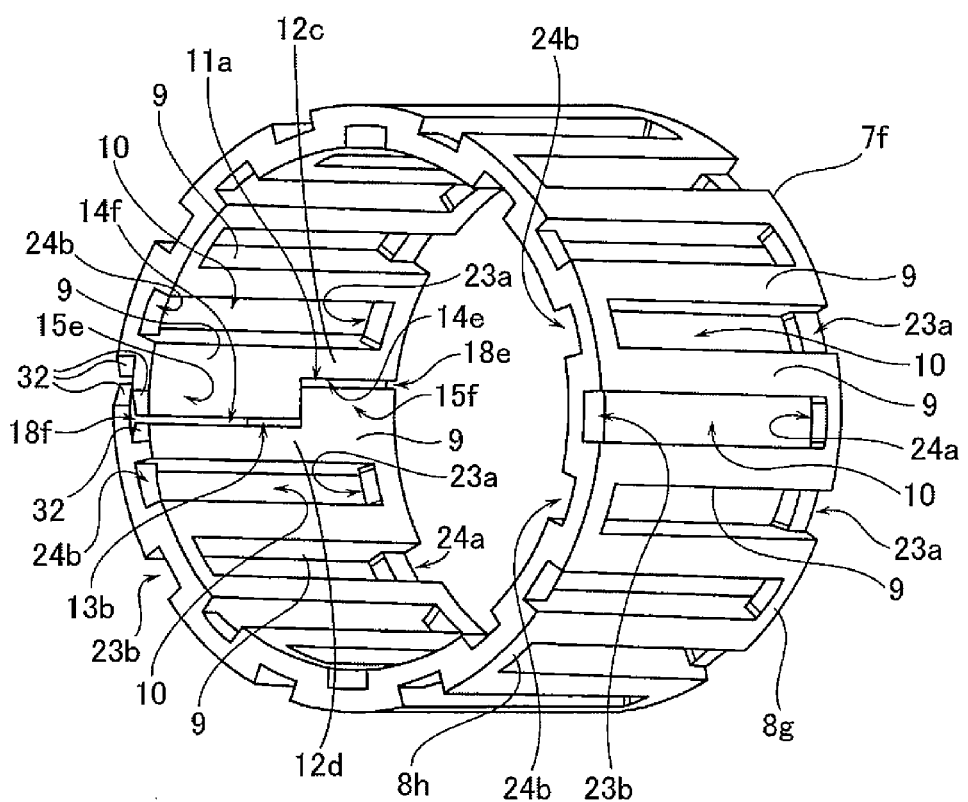
FIG. 7 is a perspective drawing illustrating the overall construction of the cage for a radial roller bearing of the fourth example, and is as seen from the inside in the radial direction of the fitting section.
Figure 8:
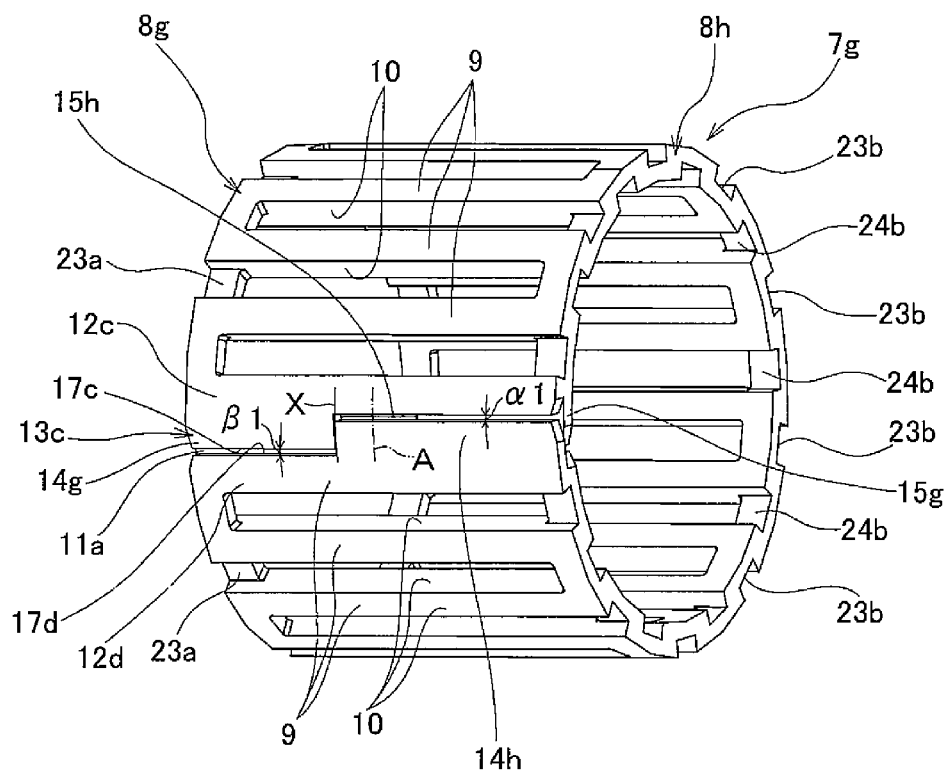
FIG. 8 is a perspective drawing illustrating the overall construction of a cage for a radial roller bearing of a fifth example of an embodiment of the present invention, and is as seen from the outside in the radial direction of the fitting section.
Figure 9:
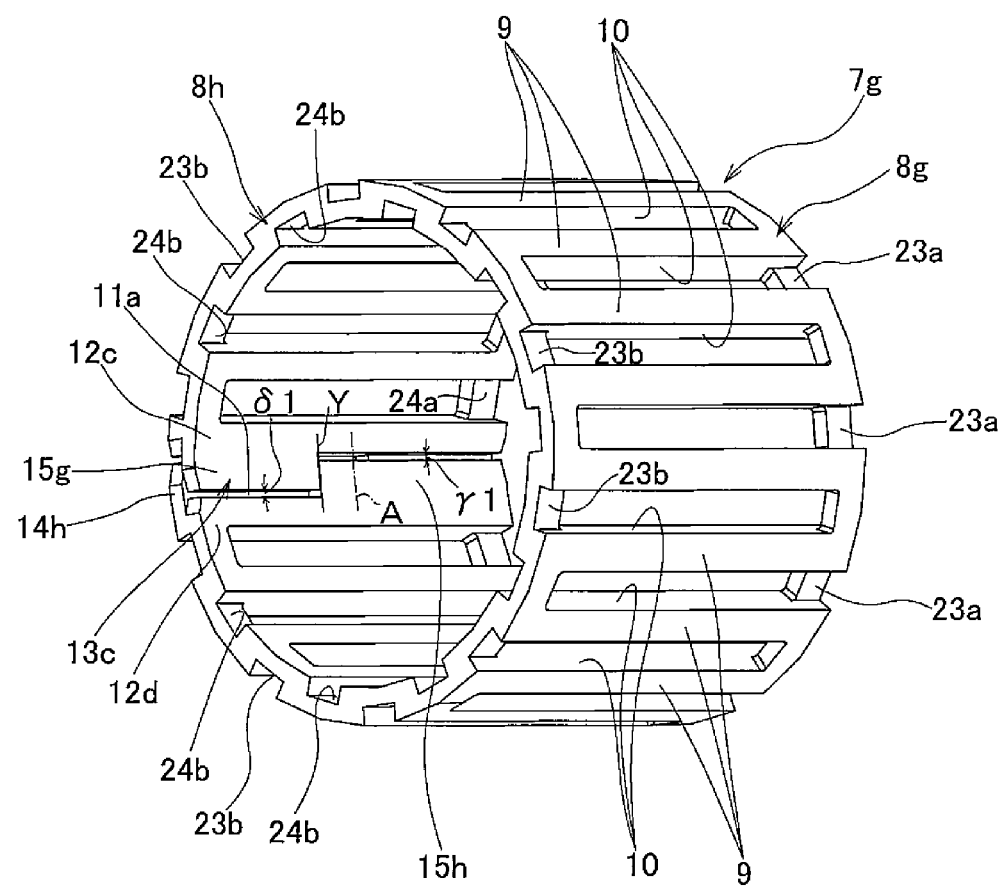
FIG. 9 is a perspective drawing illustrating the overall construction of the cage for a radial roller bearing of the fifth example, and is as seen from the inside in the radial direction of the fitting section.
Figure 10:
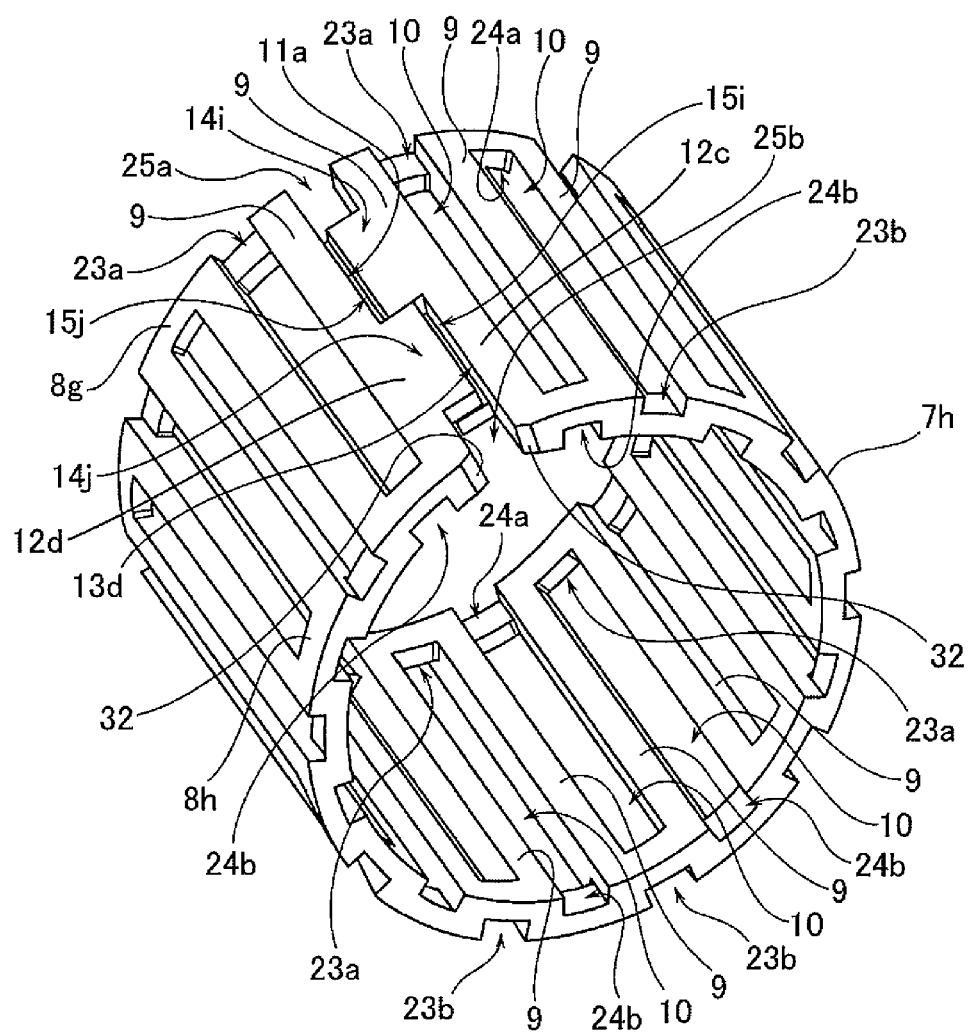
FIG. 10 is a perspective drawing illustrating the overall construction of a cage for a radial roller bearing of a sixth example of an embodiment of the present invention, and is as seen from the outside in the radial direction of the fitting section.
Figure 11:
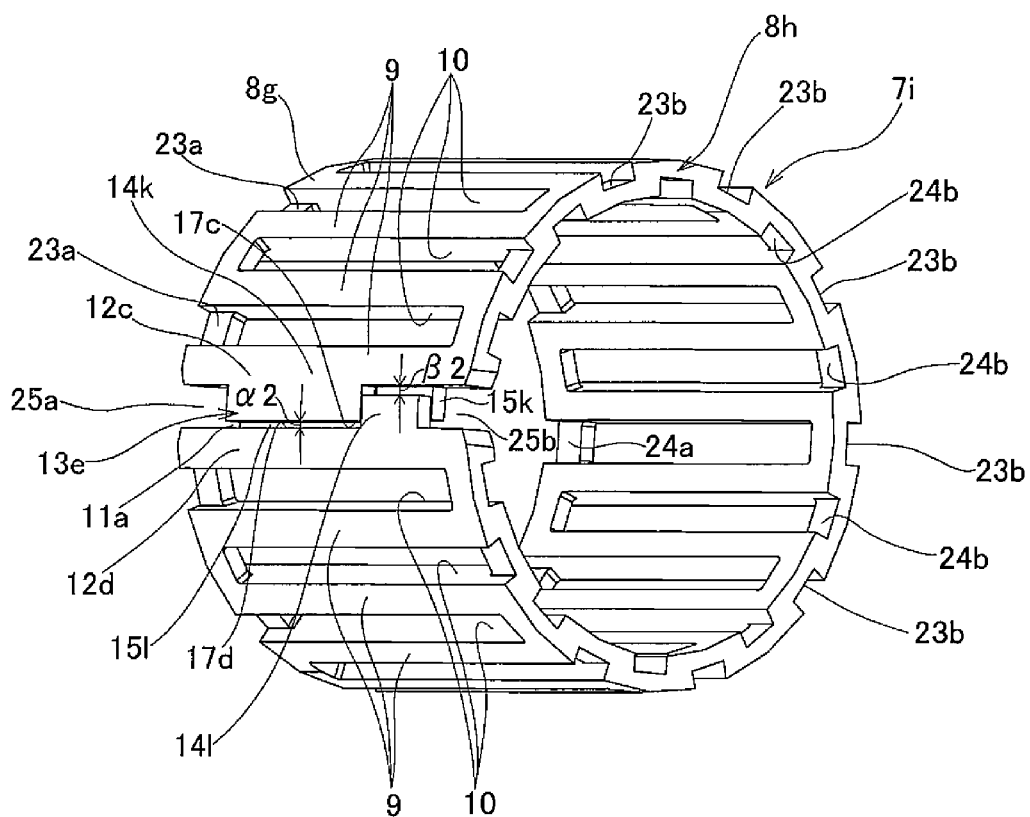
FIG. 11 is a perspective drawing illustrating the overall construction of a cage for a radial roller bearing of a seventh example of an embodiment of the present invention, and is as seen from the outside in the radial direction of the fitting section.
Figure 12:
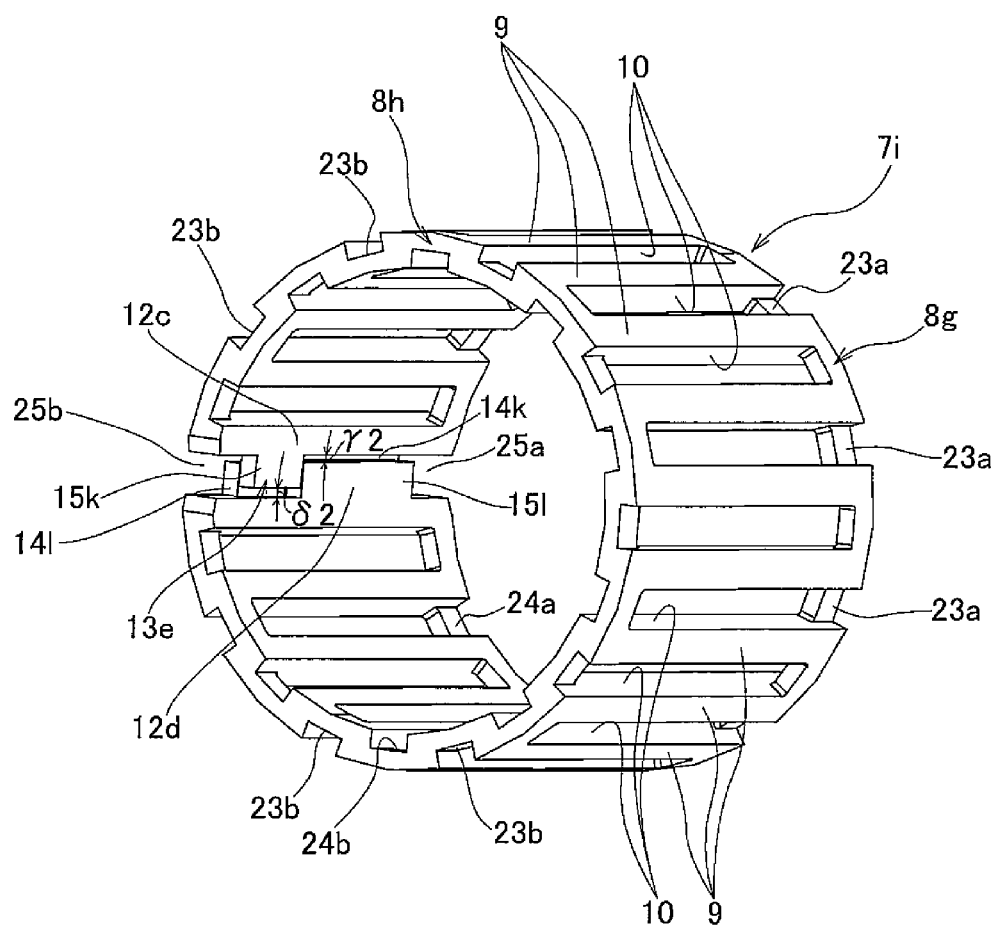
FIG. 12 is a perspective drawing illustrating the overall construction of the cage for a radial roller bearing of the seventh example, and is as seen from the inside in the radial direction of the fitting section.
Figure 13:
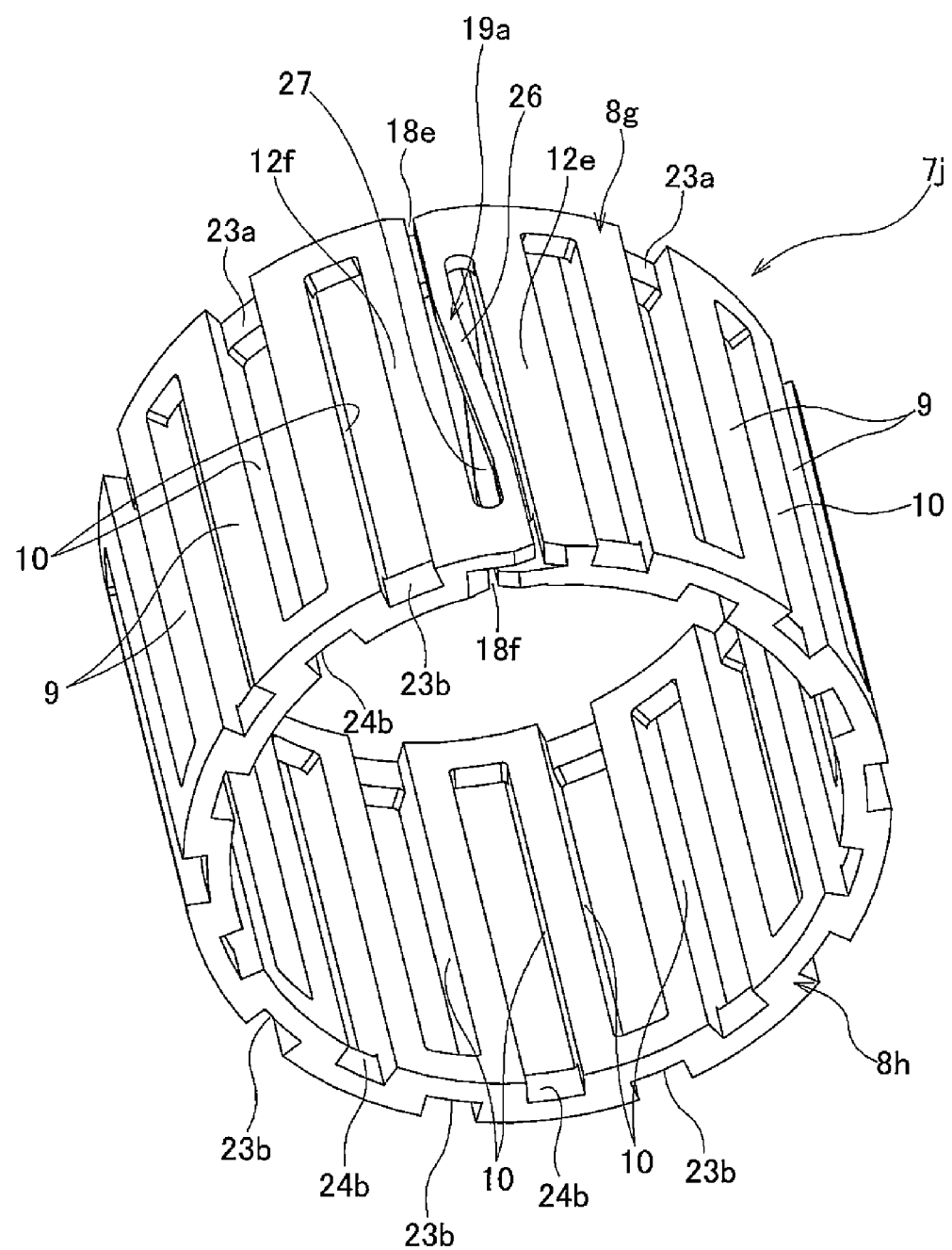
FIG. 13 is a perspective drawing illustrating the overall construction of a cage for a radial roller bearing of an eighth example of an embodiment of the present invention, and is as seen from the outside in the radial direction of the elastic connecting section.
Figure 14:
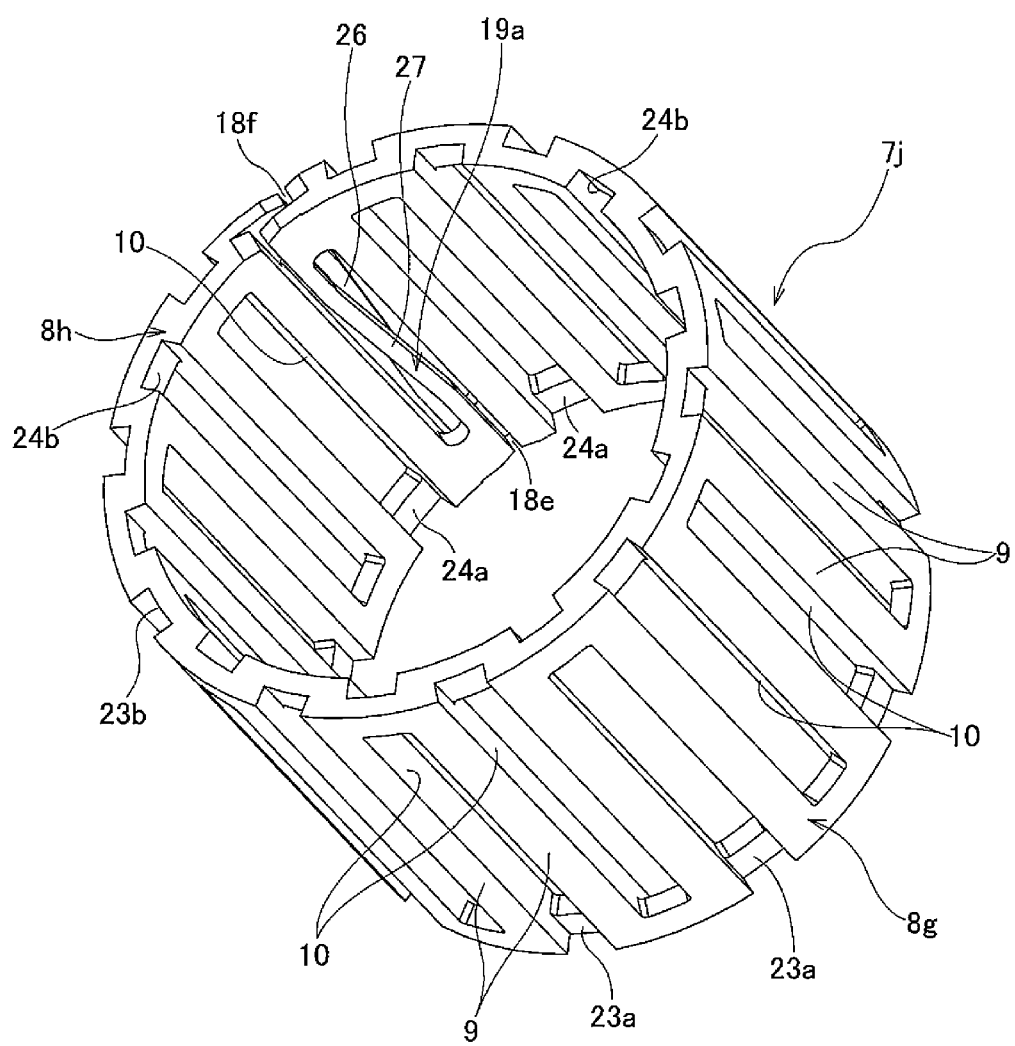
FIG. 14 is a perspective drawing illustrating the overall construction of the cage for a radial roller bearing of the eighth example, and is as seen from the inside in the radial direction of the elastic connecting section.

FIG. 4 to FIG. 12 illustrate examples of construction of a cage that is constructed such that the pair of rim sections have an incomplete circular ring shape (C shape) having a cut in one location in the circumferential direction. In the following, a third example of an embodiment of cage construction as illustrated in FIG. 4 and FIG. 5 will be explained, a fourth example of an embodiment of cage construction as illustrated in FIG. 6 and FIG. 7 will be explained, a fifth example of an embodiment of cage construction as illustrated in FIG. 8 and FIG. 9 will be explained, a sixth example of an embodiment of cage construction as illustrated in FIG. 10 will be explained, and a seventh example of an embodiment of cage construction as illustrated in FIG. 11 and FIG. 12 will be explained.

The cages of the third to seventh examples of an embodiment are constructed such that the pair of rim sections have an incomplete circular ring shape (C shape) having a cut at one location in the circumferential direction, and in each, construction is such that, together with uniformly arranging outer-diameter side concave sections and inner-diameter concave sections around the pair of rim sections, the outer-diameter side concave sections and inner-diameter concave sections are uniformly arranged on the outer-diameter sides and inner-diameter sides of these rim sections, and the basic cage construction is common with the cage of the first example of an embodiment. Therefore, portions that are the same or similar will be given the same reference numbers in the drawings, and explanations thereof will be omitted or simplified, so that only the features of these examples will be described in detail.

FIG. 4 and FIG. 5 illustrate a cage 7e of a third example of an embodiment. The cage 7e of this example has a pair of rim sections 8g, 8h, and a plurality of column sections that are intermittently arranged in the circumferential direction and span between the rim sections 8g, 8h. The portions that are surrounded on four sides by column sections 9 that are adjacent in the circumferential direction and the rim sections 8g, 8h function as pockets 10 for holding the rollers so as to be able to roll freely.

The pair of rim sections 8g, 8h are constructed so as to have an incomplete circular ring shape (C shape) having cuts 18e, 18f at one location in the circumferential direction, with the phase in the circumferential direction of these cuts 18e, 18f being virtually the same, and the rim sections 8g, 8h are concentric with each other, being separated in the axial direction. As a result, the cage 7e is provided with a non-continuous section 11a that includes the cuts 18e, 18f in one location in the circumferential direction. The diameter dimension of the rim sections 8g, 8h and the interval in the axial direction are arbitrarily set according to the size of the radial roller bearing.

In this example, cuts 18e, 18f are provided at one location in the circumferential direction of the rim sections 8g, 8h, and of the portions between adjacent column sections 9 in the circumferential direction, a pocket is not formed in the portion that coincides with the phase in the circumferential direction with the cuts 18e, 18f. Therefore, the cage 7e of this example is constructed such that there is no roller in one part (non-continuous section) in the circumferential direction.

By forming cuts 18e, 18f at one location in the circumferential direction of the pair of rim sections 8g, 8h, construction of the cage 7e is such that there is a non-continuous section 11a at one location in the circumferential direction (so-called one-split cage construction), so the following effect is obtained. In other words, when a force is applied to the cage 7e in a direction that causes the width of the non-continuous section 11a to expand in the circumferential direction (in a direction that separates both opposing end surfaces on both sides of the cuts 18e, 18f), the entire cage 7e elastically deforms. As a result, it is possible to expand the diameter of the cage 7e. Moreover, when a force is applied in a direction that causes the width of the non-continuous section 11a to contract in the circumferential direction (in a direction that brings both opposing end surfaces on both sides of the cuts 18e, 18f close to each other) from this state, the entire cage 7e elastically deforms to the original state before expansion of the non-continuous section 11a. As a result, the diameter of the cage 7e contracts and it is possible to return to the original diameter dimension. It is also possible to employ cage construction in which the diameter of the cage 7e contracts and returns to the original diameter dimension by just the elastic restoration force by releasing the force applied in a direction causing the width of the non-continuous section 11a to expand without applying a force to the cage 7e in the direction causing the width of the non-continuous to contract, or by adding a force in the contracting direction to the elastic restoration force.

With this kind of construction, the dimension of the diameter of the cage 7e can be expanded or contracted freely, so it is possible to easily assemble the cage 7e around an inner-diameter side member having a stepped section or protruding section of various sizes. For example, in the case in which a stepped section or flange shaped protruding section whose outer diameter dimension is set to be larger than the inner-diameter dimension of the cage is provided between the end section and inner-ring raceway on the outer circumferential surface of the rotating shaft, when assembling the cage 7e around the rotating shaft, by expanding the width of the non-continuous section 11a in the circumferential direction, the cage 7e can be smoothly moved in the axial direction to the inner-ring raceway of the rotating shaft without interference from the stepped section or protruding section. However, in the case that the width of the non-continuous section 11a of the cage 7e expands again after the cage 7e has been assembled around the rotating shaft in this way, there is a possibility that the cage 7e will drop, or the position will shift. Therefore, it is possible to provide a fitting mechanism (fitting section 13a) in the cage 7e for preventing such a situation. This fitting mechanism functions to keep the diameter dimension of the cage 7e constant during operation of the radial roller bearing.

FIG. 4 and FIG. 5 illustrate construction in which the end sections 12c, 12d that are provided on both sides of the non-continuous section 11a fit together (uneven fit) by the fitting section 13a such that relative displacement is not possible in either the axial direction or radial direction. One set each of an outer-diameter side fitting piece 14c, 14d and inner-diameter fitting piece 15c, 15d of the fitting section 13a is formed on the end sections 12c, 12d. More specifically, on one end section 12c, an outer-diameter side fitting piece 14c is formed on one half section in the axial direction of the outer-diameter side half section and extends toward the other end section 12d, and an inner-diameter side fitting piece 15c is formed on the other half section in the axial direction of the inner-diameter side half section, and extends toward the other end section 12d. Moreover, on the other end section 12d, an outer-diameter side fitting piece 14d is formed on the other half section in the axial direction of the outer-diameter side half section and extends toward the one end section 12c, and an inner-diameter side fitting piece 15d is formed on the one half section in the axial direction of the inner-diameter side half section, and extends toward the one end section 12c. In other words, a set of convex sections that are composed of outer-diameter side fitting pieces 14c, 14d and inner-diameter side fitting pieces 15c, 15d, and a set of concave sections that are composed of the remaining sections (portions separated from the fitting pieces 14c, 14d, 15c, 15d) are formed on each of the end sections 12c, 12d. This fitting mechanism (fitting section) can also be such that the end sections on both sides of the non-continuous section fit together such that relative displacement is not possible in at least the axial direction. For example, construction in which a fitting piece is provided on the one half section in the axial direction of one end section, and extends toward the other end section, and a fitting piece is provided on the other half section in the axial direction of the other end section, and extends toward the one end section, or arbitrary construction in which the end sections, on which combinations of fitting pieces such as these are formed, are fitted together such that relative displacement in at least the axial direction is not possible, or such that relative displacement in both the axial direction and radial direction is not possible can be employed, and this construction is also included in the present invention.

With the cage 7e assembled in the radial roller bearing, the part of outer-diameter side fitting pieces 14c, 14d and pair of inner-diameter fitting pieces 15c, 15d fit together in the axial direction on the outer-diameter half section and inner-diameter half section of the fitting section 13a, and the outer-diameter fitting pieces 14c, 14d and inner-diameter fitting pieces 15d, 15c fit together in the radial direction on the one half section in the axial direction and the other half section in the axial direction of the fitting section 13a. More specifically, the side surfaces in the axial direction of the pair of outer-diameter side fitting pieces 14c, 14d come in contact or closely face each other, and the side surfaces in the axial direction of the pair of inner-diameter side fitting pieces 15c, 15d come in contact or closely face each other. Moreover, the inside surface in the radial direction of the outer-diameter side fitting piece 14c and the outside surface in the radial direction of the inner-diameter side fitting piece 15d come in contact or closely face each other, and the inside surface in the radial direction of the outer-diameter side fitting piece 14d and the outside surface in the radial direction of the inner-diameter side fitting piece 15c come in contact or closely face each other.

In the case of this example, relative displacement in the axial direction and radial direction (and in a twisting direction) of the end sections 12c, 12d is not possible. Therefore, expansion of the diameter of the cage 7e due to centrifugal for that acts during operation of the radial roller bearing is not prevented, even when trying to expand the diameter.

Moreover, when performing axial draw molding and the pair of split molds are moving in the axial direction, the outer-diameter side fitting pieces 14c, 14d and the inner-diameter side fitting pieces 15c, 15d that are formed in a positional relationship as described above do not interfere with the split molds. In other words, the split mold on one side, part of which is located in the portion on the other side in the axial direction of the outer-diameter side fitting section 14c, and in the portion on the other side in the axial direction of the inner-diameter side fitting piece 15d during injection molding, is pulled out toward the other side in the axial direction after injection molding. On the other hand, the split mold on the other side, part of which is located in the portion on the one side in the axial direction of the outer-diameter side fitting section 14d, and in the portion on the one side in the axial direction of the inner-diameter side fitting piece 15c during injection molding, is pulled out toward the other side in the axial direction after injection molding. Therefore, when moving each of the split molds in the axial direction, the outer-diameter side fitting piece 14c, 14d and the inner-diameter side fitting piece 15c, 15d do not interfere with the split molds.

In the case of this example, the outer-diameter side fitting pieces 14c, 14d and the inner-diameter side fitting pieces 15c, 15d of the fitting section 13a are such that the dimension of each in the radial direction (thickness) is half the dimension in the radial direction of the end sections 12c, 12d. However, for one of the outer-diameter side fitting piece 14c and the inner-diameter side fitting piece 15d, and for one of the outer-diameter side fitting piece 14d and inner-diameter fitting piece 15c that overlap in the radial direction, it is possible to change the thickness, for example, so that one is thicker than the other. Moreover, both the outer-diameter side fitting pieces 14c, 14d and the inner-diameter side fitting pieces 15c, 15d are constructed so as to be rectangular plate shaped, however it is possible to change the shape to some other shape. In other words, the thickness and shape of the outer-diameter side fitting pieces 14c, 14d and the inner-diameter side fitting pieces 15c, 15d can be arbitrarily changed while maintaining the function of the fitting section 13a, with the premise that the cage will be made by axial draw molding.

In the construction illustrated in FIG. 6 and FIG. 7, of the pair of outer-diameter side fitting pieces 14e, 14f of the fitting section 13b, the dimension in the axial direction of the outer-diameter side fitting piece 14e that is provided on one end section 12c is greater than the dimension in the axial direction of the outer-diameter side fitting piece 14f that is provided on the other end section 12d. Moreover, of the pair of inner-diameter side fitting pieces 15e, 15f of the fitting section 13b as well, the dimension in the axial direction of the inner-diameter side fitting piece 15e that is provided on one end section 12c is greater than the dimension in the axial direction of the inner-diameter side fitting piece 15f that is provided on the other end section 12d. However, the sum of the dimensions in the axial direction of the pair of outer-diameter side fitting pieces 14e, 14f, and the sum of the dimensions in the axial direction of the pair of inner-diameter side fitting pieces 15e, 15f are the same as the dimension in the axial direction of the end sections 12c, 12d. Therefore, the fitting location in the axial direction between the outer-diameter side fitting pieces 14e, 14f and the fitting location in the axial direction of the inner-diameter side fitting pieces 15e, 15f is shifted (offset) from the center in the axial direction of the cage 7f toward opposites sides in the axial direction. Moreover, the ratio of the dimensions in the axial direction of the outer-diameter side fitting piece 14e and the outer-diameter side fitting piece 14f, and the ratio of the dimensions in the axial direction of the inner-diameter side fitting piece 15e and the inner-diameter side fitting piece 157 are about 3:2. Therefore, the fitting location of the outer-diameter side fitting pieces 14e, 14f, and the fitting location of the inner-diameter side fitting pieces 15e, 15f are offset the same amount with respect to the center.

Furthermore, the dimension in the radial direction of the outer-diameter side fitting pieces 14e, 14f and the inner-diameter side fitting pieces 15e, 15f is half the dimension in the radial direction of the end sections 12c. 12d. Therefore, in the case of the construction illustrated in FIG. 6 and FIG. 7, the surface area of the end surfaces in the circumferential direction of the outer-diameter side fitting piece 14e and the inner-diameter fitting piece 15e that have the larger dimension in the axial direction is about 3/10 the surface areas of the overall end surfaces 17c, 17d that face each other on both sides of the non-continuous section 11a, and can be made larger than in the ¼ in the case of the cage 7e having the construction of the third example of an embodiment.

Therefore, when the end surfaces 17c, 17d come in contact during operation when assembled in the radial roller bearing, it is possible to effectively prevent the end surfaces 17c, 17d from becoming not parallel with each other (tilted). Consequently, it is also possible to prevent the rollers that are held near the end sections 12c, 12d from becoming skewed, and it is possible to effectively prevent the behavior of the cage 7f from becoming unstable. Moreover, it is also possible to effectively prevent the moment load that is applied to the cage 7f from becoming large, and prevent the cage 7f from elastically deforming to a non-circular shape. By being able to prevent skewing, and keep the area of contact large, it is possible to lessen concentrated stress, so it is possible to effectively prevent the cage 7f from breaking. Furthermore, the fitting section 13b (fitting mechanism) is offset, so, on the outer-diameter side, the outer-diameter side fitting piece 14e having a large width in the axial direction can be a marking space.

FIG. 8 and FIG. 9 illustrate a cage 7g of a fifth example of an embodiment. In this example, of the pair of outer-diameter side fitting sections 14g, 14h, the dimension in the axial direction of the outer-diameter side fitting piece 14g that is provided on one end section 12c is less than the dimension in the axial direction of the outer-diameter side fitting piece 14h that is provided on the other end section 12d. Moreover, of the pair of inner-diameter side fitting pieces 15g, 15h, the dimension in the axial direction of the inner-diameter side fitting piece 15g that is provided on the one end section 12c is less than the dimension in the axial direction of the inner-diameter side fitting piece 15h that is provided on the other end section 12d. As a result, the fitting location in the axial direction of the outer-diameter side fitting pieces 14g, 14h (solid line X in FIG. 8), and the fitting location in the axial direction of the inner-diameter side fitting pieces 15g, 15h (solid line Y in FIG. 9) are shifted (offset) in opposite directions in the axial direction from the center in the axial direction of the cage 7g (chain line A in FIGS. 8 and 9). Moreover, in this example, the ratio of the dimensions in the axial direction of the outer-diameter side fitting piece 14g and the outer-diameter side fitting piece 14h, and the ratio of the dimensions in the axial direction of the inner-diameter side fitting piece 15g and the inner-diameter side fitting piece 15h are both 2:3. Furthermore, the dimension in the radial direction of the outer-diameter side fitting pieces 14g, 14h and the inner-diameter side fitting pieces 15g, 15h is about ½ the dimension in the radial direction of the end sections 12c, 12d.

Furthermore, when the cage 7g is assembled in the radial roller bearing, the size of a gap between the end surfaces in the circumferential direction of the outer-diameter side fitting pieces 14g, 14h and the inner-diameter side fitting pieces 15g, 15h and the opposing surfaces that face these end surfaces in the circumferential direction is regulated as described in the following. In other words, of the pair of outer-diameter side fitting pieces 14g, 14h, the size of the gap α1 between the end surface in the circumferential direction of the outer-diameter side fitting piece 14h, having the larger dimension in the axial direction, and the opposing surface that faces that end surface in the circumferential direction is less than the size of the gap 131 between the end surface in the circumferential direction of the outer-diameter side fitting piece 14g, having the small dimension in the axial direction, and the opposing surface that faces that end surface in the circumferential direction (α1<β1). In addition, of the pair of inner-diameter side fitting pieces 15g, 15h, the size of the gap γ1 between the end surface in the circumferential direction of the inner-diameter side fitting piece 15h, having the larger dimension in the axial direction, and the opposing surface that faces that end surface in the circumferential direction is less than the size of the gap δ1 between the end surface in the circumferential direction of the inner-diameter side fitting piece 15g, having the smaller dimension in the axial direction, and the opposing surface that faces that end surface in the circumferential direction (γ1<δ1). In the example in the figure, gap α1 is about 0.7 times gap β, and gap γ1 is about 0.7 times δ1.

Furthermore, the size of the gap α1 between the outer-diameter side fitting piece 14h, having the larger dimension in the axial direction, and the opposing surface is the same as (including being practically the same as) the size of the gap γ1 between the inner-diameter side fitting piece 15h, having the greater dimension in the axial direction, and the opposing surface (α1=γ1). In addition, the size of the gap β1 between the end surface in the circumferential direction of the outer-diameter side fitting piece 14g, having the smaller dimension in the axial direction, and the opposing surface is the same as (including being practically the same as) the size of the gap δ1 between the end surface in the circumferential direction of the inner-diameter side fitting piece 15g, having the smaller dimension in the axial direction, and the opposing surface (β1=δ1).

The cage 7g is made by axial draw molding that uses a pair of split molds, so in the state immediately after both split molds have been pulled apart in the axial direction, the end sections 12c, 12d are still not fitted together (there is a gap between the end sections 12c, 12d). However, in the process of the cage 7g cooling to room temperature, the diameter of the cage contracts, so as illustrated in the figure, the both end sections 12c, 12d fit together, and the size of the gaps between the end surface in the circumferential direction of the outer-diameter side fitting pieces 14g, 14h and the inner-diameter side fitting pieces 15g, 15h are as described above. However, in actuality, there are cases in which during the cooling process the cage 7g does not contract as desired, however, the cage 7g is made using synthetic resin and has high elasticity, so after assembly, following the opposing member (elastic deformation), the shape becomes the desired shape (the relationships of the gaps are obtained).

Moreover, preferably, the size of the gaps in the outer-diameter side fitting piece 14g and the inner-diameter side fitting piece 15g having the smaller dimension in the axial direction, as was explained above, are the same (β1=δ1), however, it is not absolutely necessary that the size of these gaps be regulated so as to be the same. The size of these gaps is set to a size so that at least one of the fitting pieces, the outer-diameter side fitting piece 14g and inner-diameter fitting piece 15g, to fit with the adjacent fitting piece in the axial direction and radial direction (able to maintain the amount of overlap) so that there is no separation of the fitting section (the end sections 12c, 12d do not separate) due to centrifugal force that acts on the cage 7g during operation.

With the cage 7g of this example, not only work of assembly improved, but even in the case of a cage having a small dimension in the axial direction, it is possible to stabilize the behavior during use. In other words, in the case of the cage 7g in this example, when the end surfaces 17c, 17d come in contact (collide) during operation, the end surfaces in the circumferential direction of the outer-diameter fitting piece 14h and the inner-diameter side fitting piece 15h having the larger dimension in the axial direction are able to come in contact with the respective opposing surfaces (in this state, gaps are formed between the end surfaces of the outer-diameter fitting piece 14g and the inner-diameter side fitting piece 15g having the smaller dimension in the axial direction). Therefore, even when the dimension in the axial direction of the cage 7g is small, it is possible to maintain sufficient contact area when the end surfaces 17c, 17d come in contact (in this example, there is contact over ⅗ the overall surface area of the end surfaces 17c, 17d). As a result, when these end surfaces 17c, 17d come in contact, it is possible to effectively prevent the end surfaces 17c, 17d from becoming not parallel with each other (tilted). Therefore, it is possible to prevent skewing of the rollers that are held near the end sections 12c, 12d. Moreover, it is possible to effectively prevent the moment load that is applied to the cage 7g from becoming large, as well as it is possible to prevent the cage 7g from elastically deforming to a non-cylindrical shape. Furthermore, together with suppressing skewing, by being able to keep the surface area large, it is possible to lessen stress concentration, so it is possible to effectively prevent damage to the cage 7g.

FIG. 10 illustrates a cage 7h of a sixth example of an embodiment. In this example, the outer-diameter side fitting pieces 14i, 14j and inner-diameter side fitting pieces 15i, 15j of the fitting section 13d are not formed on the end sections (rim sections 8g, 8h) in the axial direction of the end sections 12c, 12d that face each other on both sides of the non-continuous section 11a, but are formed on only the column sections 9. As a result, both end sections in the axial direction of the fitting section 13d are offset further toward the center in the axial direction than the end surfaces in the axial direction of the rim sections 8g, 8h. In other words, the fitting section 13d is provided only in the middle section in the axial direction of the cage 7h, and the both end sections in the axial direction of the cage 7h are removed.

With the cage 7h of this example, it is possible to form insertion spaces 25a, 25b in the portions on both sides in the axial direction of the fitting section 13d that are open in the portions on both side in the radial direction and on opposites sides from the fitting section 13d in the axial direction. In doing so, in the case of the cage 7h of this example, when automatically assembling the radial roller bearing (work of inserting the rollers inside the pockets 10), it is possible to insert positioning pins (not illustrated in the figure) into the insertion spaces 25a, 25b. Therefore, by accurately regulating the position in the circumferential direction of the positioning pins, it is possible to accurately line up the position in the circumferential direction of the pockets 10 with the respective insertion positions of the rollers. Moreover, it is possible to suppress the expansion and contraction of the width of the non-continuous section 11a, making it easier to keep the diameter dimension of the cage 7h at a fixed diameter. As a result, together with stabilizing the shape of the cage 7h and making it easier to line up the phase with the insertion position of the rollers, it becomes easier to perform positioning when assembling the cage 7h with an outer-diameter side member and inner-diameter side member. Therefore, together with becoming easier to automate assembly of the radial roller bearing, it is possible to improve the efficiency of the assembly work. Furthermore, together reducing the weight of the cage 7h by the amount the where the insertion spaces 25a, 25b are formed, there is also an advantage from the aspect of preventing shrinkage depressions during injection molding.

FIG. 11 and FIG. 12 illustrate a cage 7i of a seventh example of an embodiment. In the case of this example, as in the case of the sixth example of an embodiment, the outer-diameter side fitting pieces 14k, 14l and inner-diameter side fitting pieces 15k, 15l of the fitting section 13e are not formed on the end sections in the axial direction (rim sections 8g, 8h) of the end sections 12c, 12d that face each other on both sides of the non-continuous section 11a, and are only formed on the column sections 9.

Moreover, the dimensions in the axial direction of the pair of outer-diameter side fitting pieces 14k, 14l and the dimensions in the axial direction of the pair of inner-diameter side fitting pieces 15k, 15l are different from each other as in the case of the fifth example of an embodiment. In other words, of the pair of outer-diameter side fitting pieces 14k, 14l, the dimension in the axial direction of the outer-diameter side fitting piece 14k that is provided on one end section 12c is larger than the dimension in the axial direction of the outer-diameter side fitting piece 14l that is provided on the other end section 12d. On the other hand, of the pair of inner-diameter side fitting pieces 15k, 15l, the dimension in the axial direction of the inner-diameter side fitting piece 15l that is provided on the other end section 12d is larger than the dimension in the axial direction of the inner-diameter side fitting piece 15k that is provided on the one end section 12c. In this example, the sum of the dimensions in the axial direction of the pair of outer-diameter side fitting pieces 14k, 14l, and the sum of the dimensions in the axial direction of the pair of inner-diameter side fitting pieces 15k, 15l are the same, and these sums are equal to the value when the sum of the dimensions in the axial direction of the insertion spaces 25a, 25b are subtracted from the dimension in the axial direction of the end sections 12c, 12d. In this example, the ratio of the dimensions in the axial direction of the outer-diameter side fitting piece 14k and the outer-diameter side fitting piece 14l and the ratio of the dimensions in the axial direction of the inner-diameter side fitting piece 15l and the inner-diameter side fitting piece 15k are both 2:1.

Moreover, of the pair of outer-diameter side fitting pieces 14k, 14l, the gap α2 between the end surface in the circumferential direction of the outer-diameter side fitting piece 14k, having the larger dimension in the axial direction, and the opposing surface that faces this end surface in the circumferential direction is less than the size of the gap β2 between the end surface in the circumferential direction of the outer-diameter side fitting piece 14l, having the smaller dimension in the axial direction, and the opposing surface that faces this end surface in the circumferential direction (α2<β2). In addition, of the pair of inner-diameter side fitting pieces 15k, 15l, the size of the gap γ2 between the end surface in the circumferential direction of the inner-diameter side fitting piece 15l, having the larger dimension in the axial direction, and the opposing surface that faces this end surface in the circumferential direction, is less than the size of the gap δ2 between the end surface in the circumferential direction of the inner-diameter side fitting piece 15k, having the smaller dimension in the axial direction, and the opposing surface that faces this end surface in the circumferential direction (γ2<δ2). In the example in the figure, the gap α2 is about 0.7 times the gap β2, and the gap γ2 is about 0.7 times the gap δ2.

Furthermore, the size of the gap α2 between the end surface in the circumferential direction of the outer-diameter side fitting piece 14k, having the larger dimension in the axial direction, and the opposing surface is the same as (including being essentially the same as) the size of the gap δ2 between the end surface in the circumferential direction of the inner-diameter side fitting piece 15l, having the larger dimension in the axial direction, and the opposing surface (α2=γ2). In addition, the size of the gap β2 between the end surface in the circumferential direction of the outer-diameter side fitting piece 14l, having the smaller dimension in the axial direction, and the opposing surface, is the same as (including being essentially the same as) the size of the gap δ2 between the end surface in the circumferential direction of the inner-diameter side fitting piece 15k, having the smaller dimension in the axial direction, and the opposing surface (β2=δ2).

In the fifth and seventh examples of an embodiment, the fitting location of the pair of outer-diameter side fitting pieces and the fitting location of the pair of inner-diameter side fitting pieces are offset from the center location in the axial direction of the cage to opposite sides in the axial direction, however, they can also be offset toward the same side. In that case, preferably the amount of offset is the same. With this kind of construction, it becomes easier to make the volume of the end sections uniform. Moreover, in the sixth example and seventh example of an embodiment, insertion spaces for inserting positioning pins were formed on both sides in the axial direction of the fitting section, however, it is also possible to employ construction where an insertion space is provided on only one side.

In the case of the third to seventh examples of an embodiment, the side surfaces 32 in the axial direction of the end sections 12c, 12d that face each other on both sides of the cuts 18e, 18f are tapered surfaces that are inclined in a direction such that the dimension in the axial direction of both end sections 12c, 12d becomes smaller going toward the cuts 18e, 18f. The length in the circumferential direction and the width dimension in the radial direction of the tapered surface and the angle of inclination can be arbitrarily set according to the size and thickness of the cage, and the shape of the guide surfaces of the opposing members in which the bearing is assembled.

By providing a tapered surface in this way, it is possible to prevent the cage (non-continuous section) from catching on the guide surface regardless of the location of contact of the cage with the guide surfaces when the cage shift in the axial direction, and thus it is possible to prevent rotation of the cage.

Eight Example and Ninth Example

FIG. 13 to FIG. 22 illustrate examples of a cage in which an elastic connecting section is provided. The construction of the cage illustrated in FIG. 13 to FIG. 17 is explained as an eighth example of an embodiment, and the construction of the cage illustrated in FIG. 18 to FIG. 22 is explained as a ninth example of an embodiment. In the eighth example and ninth example of an embodiment, an elastic connecting section is provided instead of a fitting section, however, the other members have the same construction as the construction of the third example of an embodiment, so the same reference numbers will be used in the drawings for identical or similar components.

Even in the case of the cage 7j of the eighth example of an embodiment illustrated in FIG. 13 to FIG. 17, cuts 18e, 18f are provided in the portions of the pair of rim sections 8g, 8h where the phase in the circumferential direction is the same. An elastic connecting section 19a is provided between the end sections 12e, 12f that are able to move away from or toward each other in the circumferential direction of the rim sections 8g, 8h and columns 9.

Figure 15:
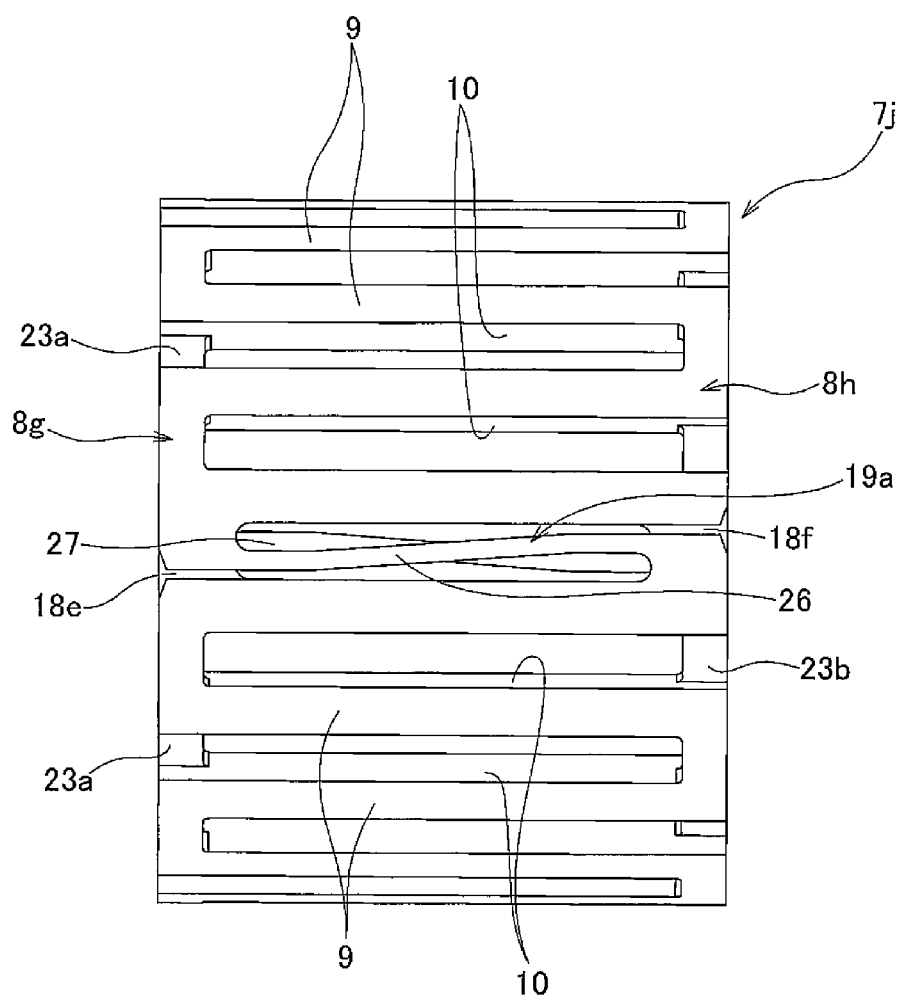
FIG. 15 is a drawing illustrating an elastic connecting section of the cage for a radial roller bearing of the eighth example, and is as seen from the outside in the radial direction of the elastic connecting section.
Figure 16:
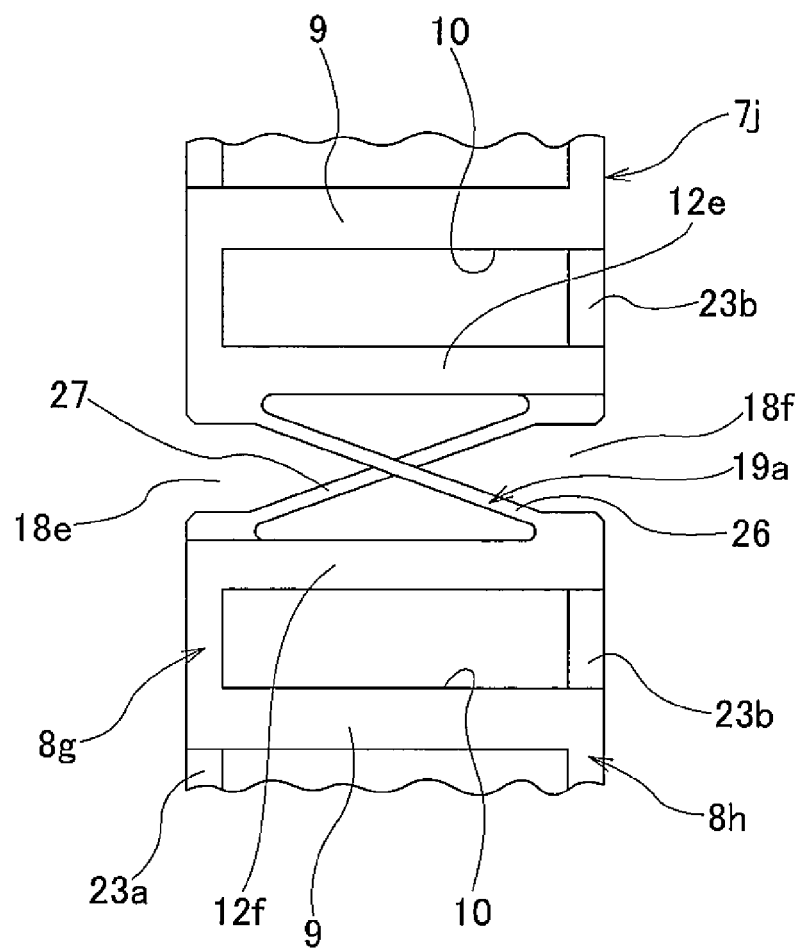
FIG. 16 is a drawing illustrating the elastic connecting section of the cage for a radial roller bearing of the eighth example in a state where the elastic connecting section is stretched in the circumferential direction, and is as seen from the inside in the radial direction of the elastic connecting section.
Figure 17:
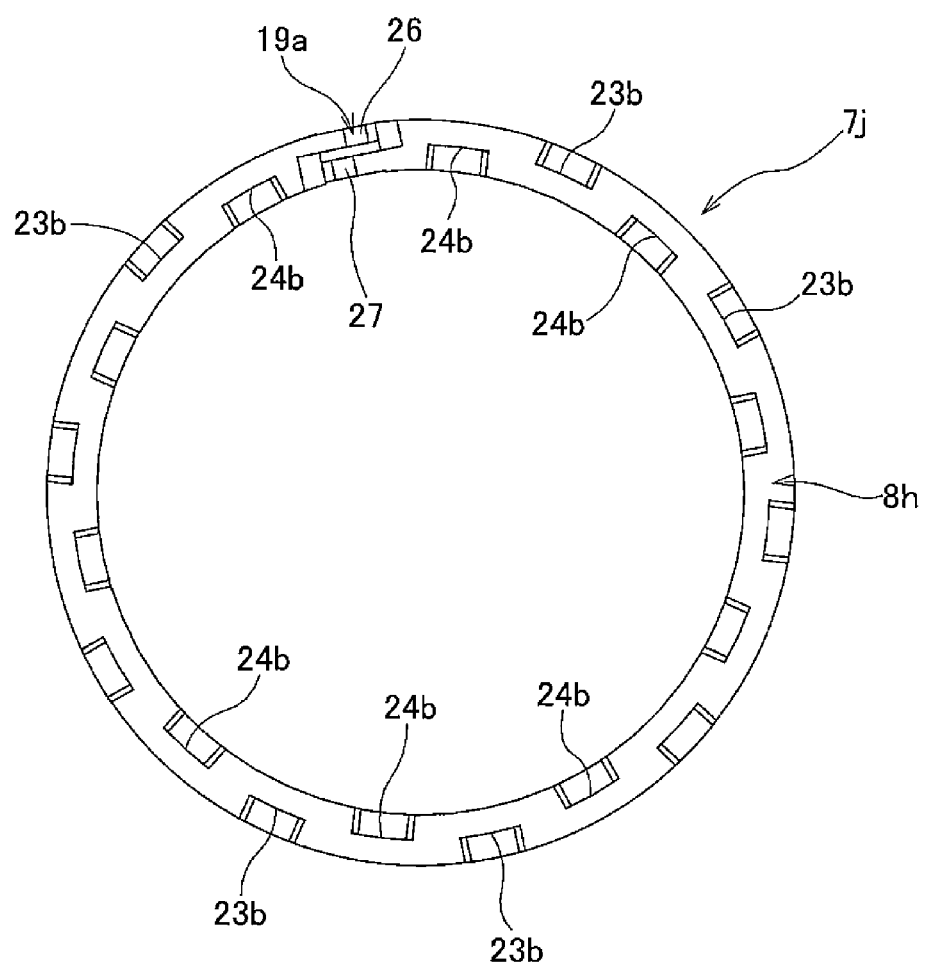
FIG. 17 is a top view illustrating an end surface in the axial direction of the cage for a radial roller bearing of the eighth example.
Figure 18:
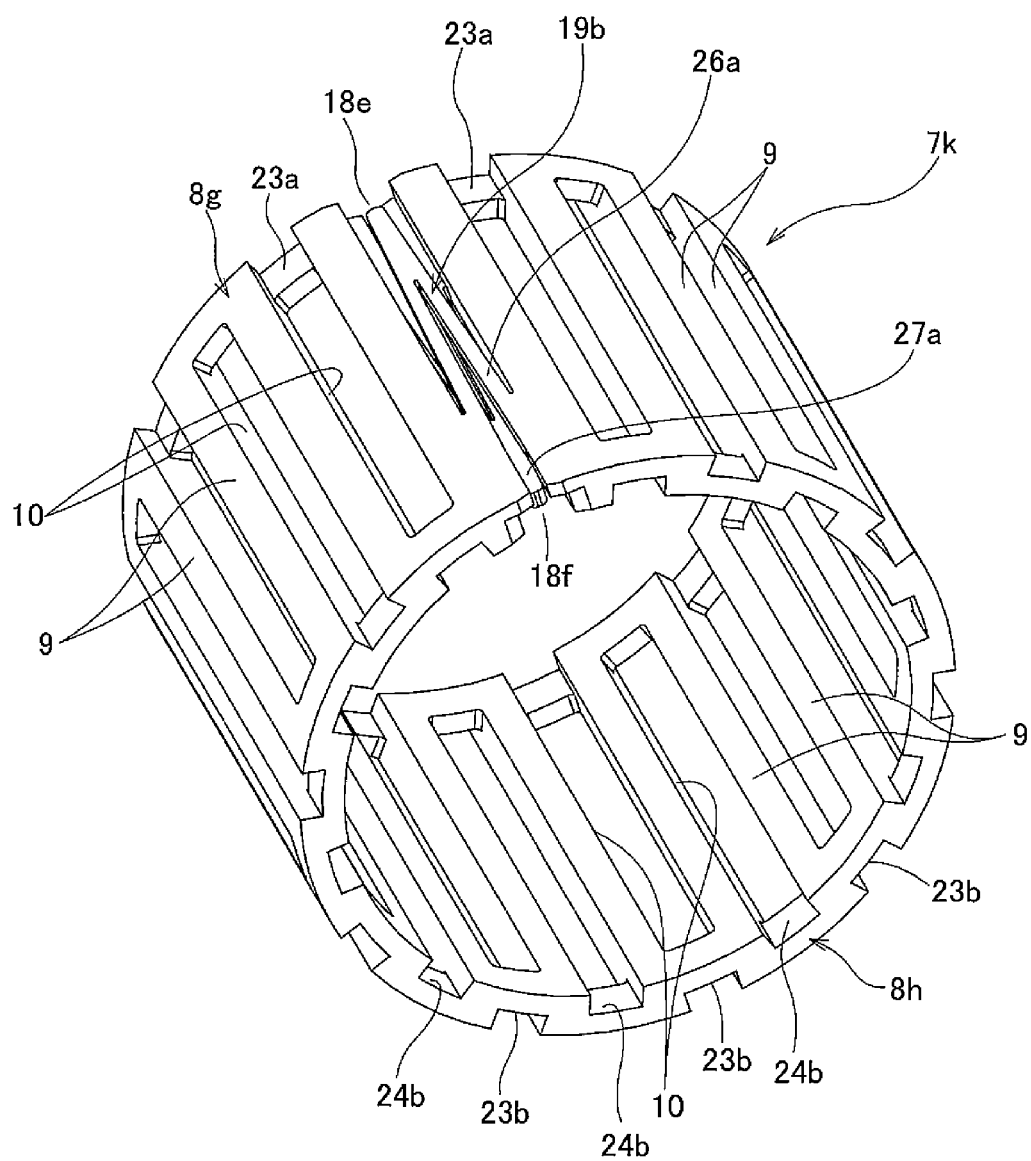
FIG. 18 is a perspective drawing illustrating the overall construction of a cage for a radial roller bearing of a ninth example of an embodiment of the present invention, and is as seen from the outside in the radial direction of the elastic connecting section.

Particularly in the case of this example, this elastic connecting section 19a is composed of an outer-diameter side elastic connecting section 26 and an inner-diameter side elastic connecting section 27 that are capable of elastic deformation in the circumferential direction. The outer-diameter side elastic connecting section 26 and the inner-diameter side elastic connecting section 27 have a virtually straight linear shape (bar shape), and are inclined with the same angle of inclination in opposite directions in the axial direction. Therefore, the shapes of the outer-diameter side elastic connecting section 26 and the inner-diameter side elastic connecting section 27 are inverted from each other in the axial direction of the cage 7j (inverted in the left and right direction in FIG. 15 and FIG. 16). To explain this more specifically, as illustrated in FIG. 15, in the completed state, the shape of the outer-diameter side elastic connecting section is a linear shape that rises to the right (/), whereas the shape of the inner-diameter side elastic connecting section 27 is a linear shape that rises to the left (mirror image of /) and is inverted in the axial direction (from left to right) from that of the outer-diameter side elastic connecting section 26. As can be clearly seen from FIG. 16, in the stretched state, the directions of inclination are opposite. Moreover, in this example, the outer-diameter side elastic connecting section 26 and the inner-diameter side elastic connecting section 27 overlap each other in the radial direction of the cage 7j, and the outer-diameter side elastic connecting section 26 and the inner-diameter side elastic connecting section 27 cross each other in the center portion in the axial direction of the cage 7j.

Therefore, the thickness dimensions in the radial direction of the outer-diameter side elastic connecting section 26 and the inner-diameter side elastic connecting section 27 is ½ or less (about ⅖ in the example in the figure) the thickness dimension in the radial direction of the rim sections 8g, 8h or the column sections 9 (or the end sections 12e, 12f), and a gap is provided between the side surface on the inner-diameter side of the outer-diameter side elastic connecting section 26 and side surface on the outer-diameter side of the inner-diameter side elastic connecting section 27. One end section in the circumferential direction of the outer-diameter side elastic connecting section 26 (end section that is located on the bottom side in the free state in FIG. 15, and on the top side in the stretched state in FIG. 16) is connected to the portion on the outer-diameter side of one end section (end section on the top side of the cut 18e in FIG. 15 and FIG. 16) in the circumferential direction of one rim section 8g, and the other end section in the circumferential direction of the outer-diameter side elastic connecting section 26 (end section located on the top side in the free state in FIG. 15, and located on the bottom side in the stretched state in FIG. 16) is connected to the portion on the outer-diameter side of the other end section in the circumferential direction of the other rim section 8h (end section located on the bottom side of the cut 18f in FIGS. 15, 16). On the other hand, one end section in the circumferential direction of the inner-diameter side elastic connecting section 27 is connected to the portion on the inner-diameter side of one end section in the circumferential direction of the other rim section 8h, and the other end section in the circumferential direction of the inner-diameter side elastic connecting section 27 is connected to the portion on the inner-diameter side of the other end section in the circumferential direction of the one rim section 8g. Moreover, in this example, the thickness dimension in the radial direction and the width dimension (thickness) of the outer-diameter side elastic connecting section 26 and the inner-diameter side elastic connecting section 27 are constant over the entire length.

FIG. 13 to FIG. 15 and FIG. 17 illustrate the completed state after the cage 7j has undergone cooling and contraction. On the other hand, in the state before this kind of cooling and contraction (state immediately after the split molds have been removed), as in the case illustrated in FIG. 16, the widths in the circumferential direction of the cuts 18e, 18f are large, and the outer-diameter side elastic connecting section 26 and the inner-diameter side elastic connecting section 27 are stretched in the circumferential direction. Therefore, in this example, the outer-diameter side elastic connecting section 26 and the inner-diameter side elastic connecting section 27 can be formed so as not to interfere with the split molds. In other words, the split molds can be pull out in the axial direction without interfering with the outer-diameter side elastic connecting section 26 and the inner-diameter side elastic connecting section 27.

In construction other than that in the figures, it is possible for the direction of inclination of the outer-diameter side elastic connecting section 26 and the inner-diameter side elastic connecting section 27 to be opposite each other. Moreover, the thickness dimensions in the radial direction of the outer-diameter side elastic connecting section 26 and the inner-diameter side elastic connecting section 27 can be different from each other.

In the eighth example of an embodiment illustrated in FIG. 13 to FIG. 17, the outer-diameter side elastic connecting section 26 and the inner-diameter side elastic connecting section 27 that both have a linear shape are constructed so as overlap in the radial direction and cross each other, however, the construction of the elastic connecting section is not limited to this. For example, in the cage 7k of the ninth example of an embodiment illustrated in FIG. 18 to FIG. 22, the outer-diameter side elastic connecting section 26a and the inner-diameter side elastic connecting section 27a are both V shaped, and overlap in the radial direction.

Figure 20:
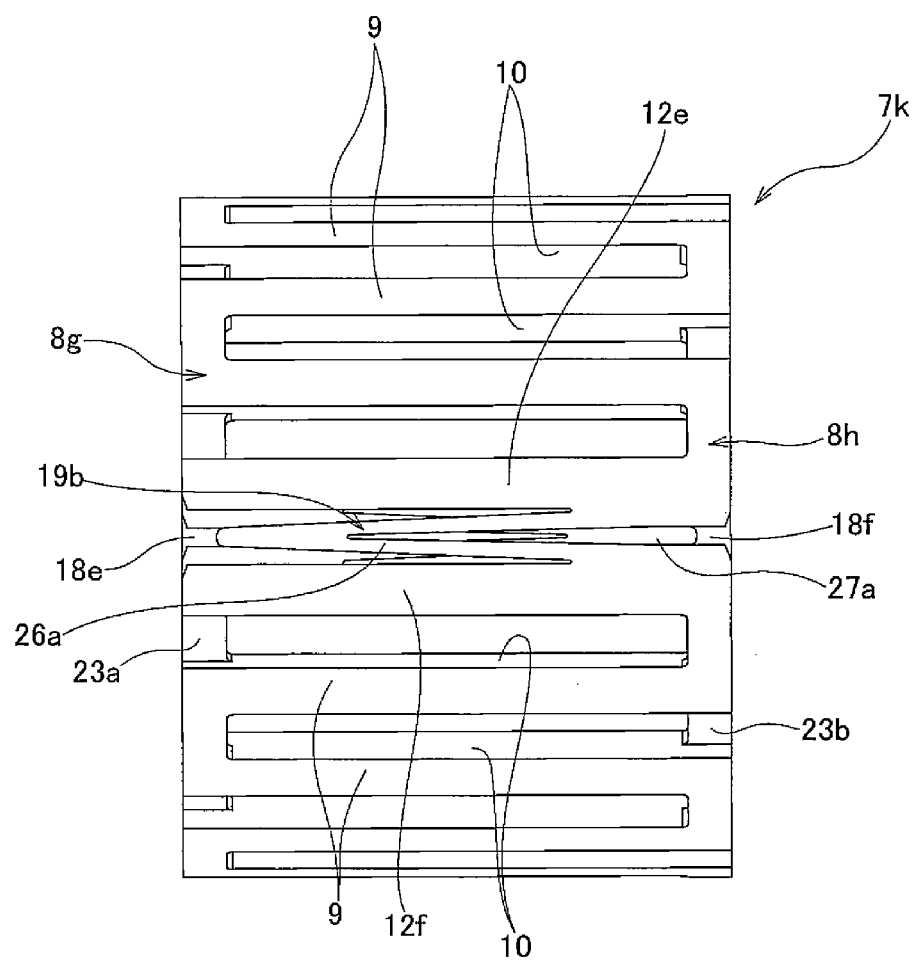
FIG. 20 is a drawing illustrating an elastic connecting section of the cage for a radial roller bearing of the ninth example, and is as seen from the outside in the radial direction of the elastic connecting section.

More specifically, the outer-diameter side elastic connecting section 26a and the inner-diameter side elastic connecting section 27a of the elastic connecting section 19b, which are able to elastically deform in the circumferential direction, have a V shape, and together with the location of the vertex (and connecting sections) of each being located opposite each other in the axial direction, the size of each vertex angle (size of the vertex angle in the free state, and in the elastically deformed state) is the same. Therefore, the outer-diameter side elastic connecting section 26a and the inner-diameter side elastic connecting section 27a are such that the shape of each are inverted from each other in the axial direction of the cage 7k (inverted in the left-right direction in FIG. 20 and FIG. 21). To explain this in more detail, as illustrated in FIG. 20, in the completed state, the shape of the outer-diameter side elastic connecting section 26a is a V shape with the vertex angle on the left side (<), and the shape of the inner-diameter side elastic connecting section 27a is a V shape with the vertex angle on the right side (>). Moreover, in this example, the outer-diameter side elastic connecting section 26a and the inner-diameter side elastic connecting section 27a overlap in the radial direction of the cage 7k, and cross each other.

The thickness dimension in the radial direction of the outer-diameter side elastic connecting section 26a and the inner-diameter side elastic connecting section 27a is ½ or less (about ⅖ in the example in the figures) of the thickness dimension in the radial direction of the rim sections 8g, 8h or the column sections 9 (or the end sections 12e, 12f).

Figure 19:
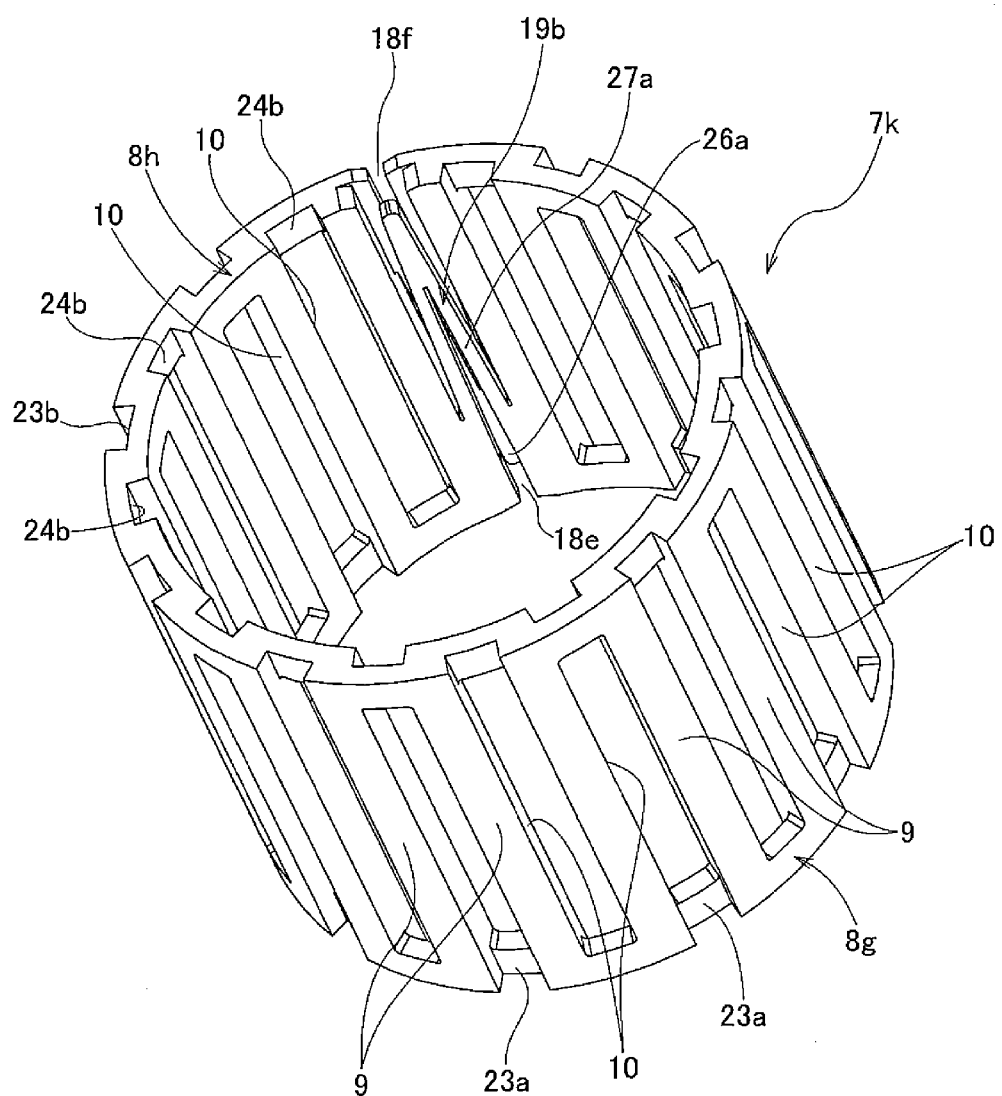
FIG. 19 is a perspective drawing illustrating the overall construction of the cage for a radial roller bearing of the ninth example, and is as seen from the inside in the radial direction of the elastic connecting section.

One end section in the circumferential direction of the outer-diameter side elastic connecting section 26a (end section located on the top side in FIG. 20 and FIG. 21) is connection to the portion on one side in the axial direction of the portion on the outer diameter side (rim section 8f side, portion on the right side in FIG. 20 and FIG. 21) of one end section 12e (end section 12e that is located on the top side of cuts 18e, 18f in FIG. 19 and FIG. 20) of both end sections 12e, 12f that are provided on both sides of the cuts 18e, 18f. The other end section in the circumferential direction of the outer-diameter side elastic connecting section 26a (end section located on the bottom side in FIG. 20 and FIG. 21) is connected to the portion on one side in the axial direction of the portion on the outer-diameter side of the other end section 12f (end section 12f located on the bottom side of cuts 18e, 18f in FIG. 20 and FIG. 21) of the end sections 12e, 12f that are provided on both sides of the cuts 18e, 18f. In other words, on the outer-diameter side of the cage 7k, both end section in the circumferential direction of the outer-diameter side elastic connecting section 26a are connected to both end sections that face each other on both sides of the cut 18f of the other rim section 8h.

On the other hand, one end section in the circumferential direction of the inner-diameter side elastic connecting section 27a is connected to the portion on the other side in the axial direction (rim section 8g side, portion on the left side in FIG. 20 and FIG. 21) of the portion on the inner-diameter side of one end section 12e of both end sections 12e, 12f that are provided on both side of the cuts 18e, 18f. Moreover, the other end section in the circumferential direction of the inner-diameter side elastic connecting section 27a is connected to the portion on the other side in the axial direction of the portion on the inner-diameter side of the other end section 12f of both end sections 12e, 12f that are provided on both sides of the cuts 18e, 18f. In other words, on the inner-diameter side of the cage 7k, both end sections in the circumferential direction of the inner-diameter side elastic connecting section 27a are connected to both end section that face each other on both sides of the cut 18e of the one rim section 8g.

Moreover, the thickness dimension in the radial direction of the outer-diameter side elastic connecting section 26a and the inner-diameter side elastic connecting section 27a are constant over the entire length. However, the width dimension is thicker near the vertices (elbow sections) of the outer-diameter side elastic connecting section 26a and the inner-diameter side elastic connecting section 27a than in the other portions.

Figure 21:
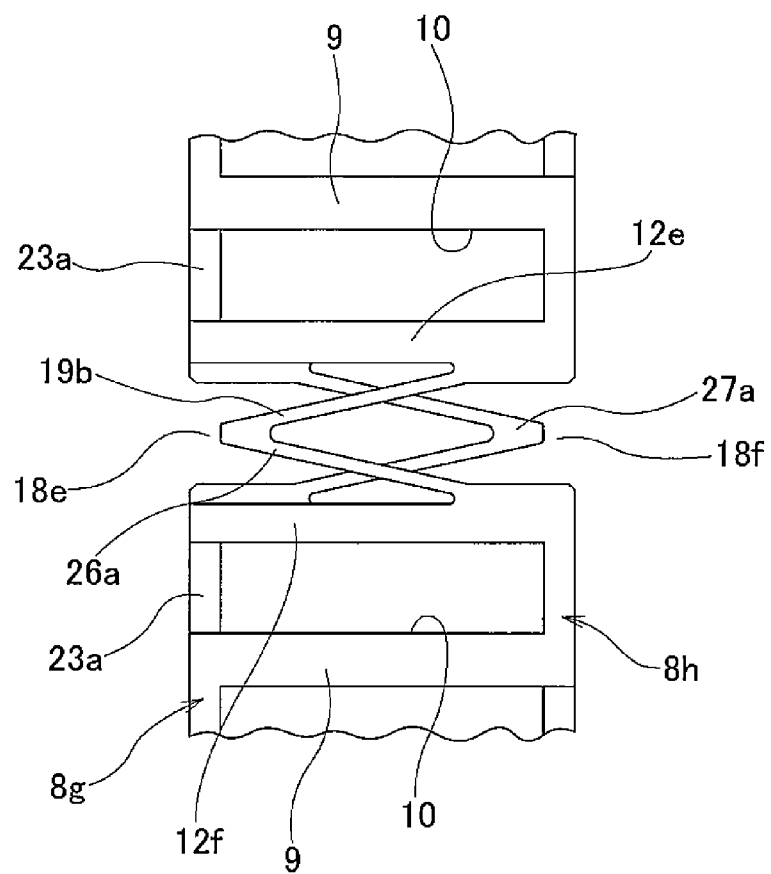
FIG. 21 is a drawing illustrating the elastic connecting section of the cage for a radial roller bearing of the ninth example in a state the elastic connecting section is stretched in the circumferential direction, and is as seen from outside in the radial direction of the elastic connecting section.
Figure 22:
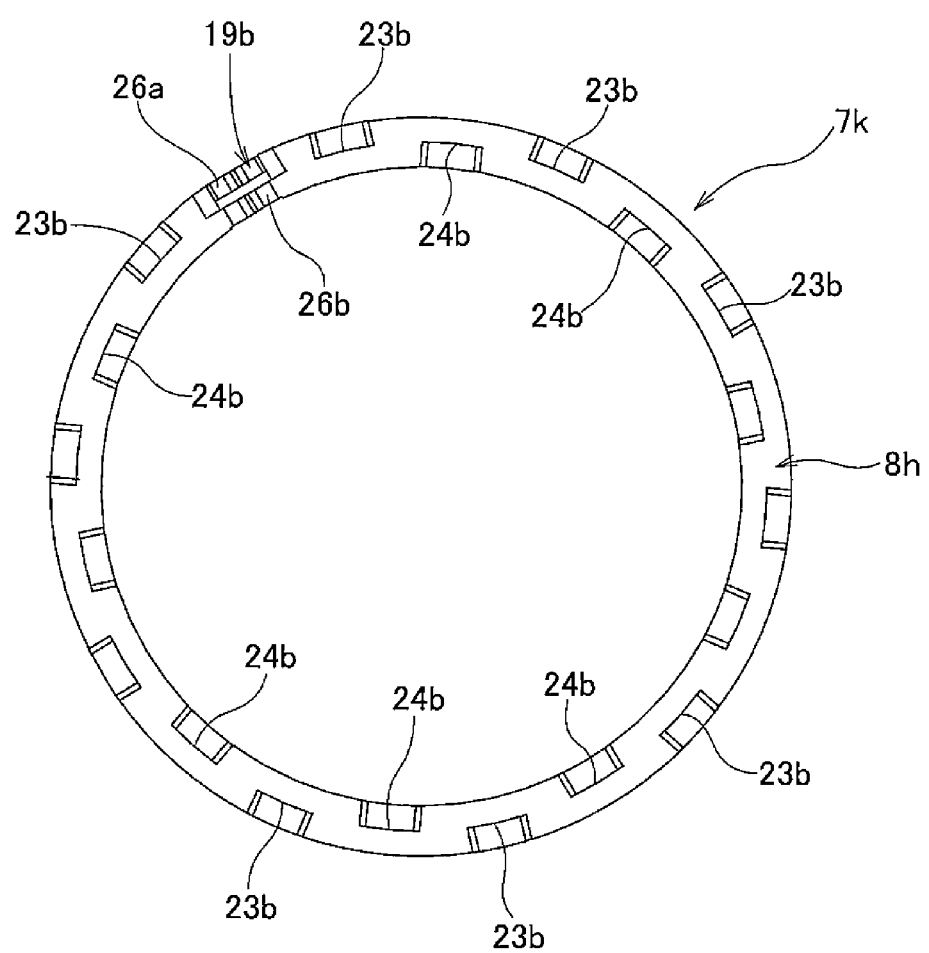
FIG. 22 is a top view illustrating an end surface in the axial direction of the cage for a radial roller bearing of the ninth example.

In the state before cooling and contraction of the cage 7k, as in the case illustrated in FIG. 21, the width in the circumferential direction of the cuts 18e, 18f is large, and the outer-diameter side elastic connecting section 26a and the inner-diameter side elastic connecting section 27a are stretched in the circumferential direction. Therefore, in this example as well, the outer-diameter side elastic connecting section 26a and the inner-diameter side elastic connecting section 27a can be formed so as to not interfere with the split molds.

In construction other than that illustrated in the figures, the outer-diameter side elastic connecting section 26a and the inner-diameter side elastic connecting section 27a can be arranged in the opposite direction. The thickness dimensions in the radial direction of the outer-diameter side elastic connecting section 26a and the inner-diameter side elastic connecting section 27a can also be different from each other.

With the cages 7j, 7k of the seventh example and eighth example of an embodiment, the work of assembly is good, and together with being able to prevent fretting wear, it is possible to obtain sufficient elastic force in the elastic connecting section 19a, 19b, and the behavior during operation is stable.

Having good assembly characteristics and being able to prevent fretting wear is due to providing elastic connecting section 19a, 19b (elastic connecting sections 26, 26a, 27, 27a on outer-diameter side and inner-diameter side) that are capable of elastic deformation in the circumferential direction in part in the circumferential direction. In other words, by stretching the elastic connecting section 19a, 19b in the circumferential direction, it is possible to expand the width of the cuts 18e, 18f in the circumferential direction. Therefore, it is possible to easily assemble the cage 7j, 7k around the outer circumferential surface of a rotating shaft or the like, even when there is an obstacle such as an outward facing flange shaped protrusion on that surface. Moreover, when the cage 7j, 7k rotates, the elastic connecting section 19a, 19b are able to stretch in the circumferential direction or elastically be restored according to the rotational speed (size of the centrifugal force that acts). Therefore, the contact location between the rolling surfaces of the rollers and the outer-ring raceway and inner-ring raceway can vary. Consequently, together with having good assembly characteristics, it is possible to effectively prevent fretting wear.

Figure 27:
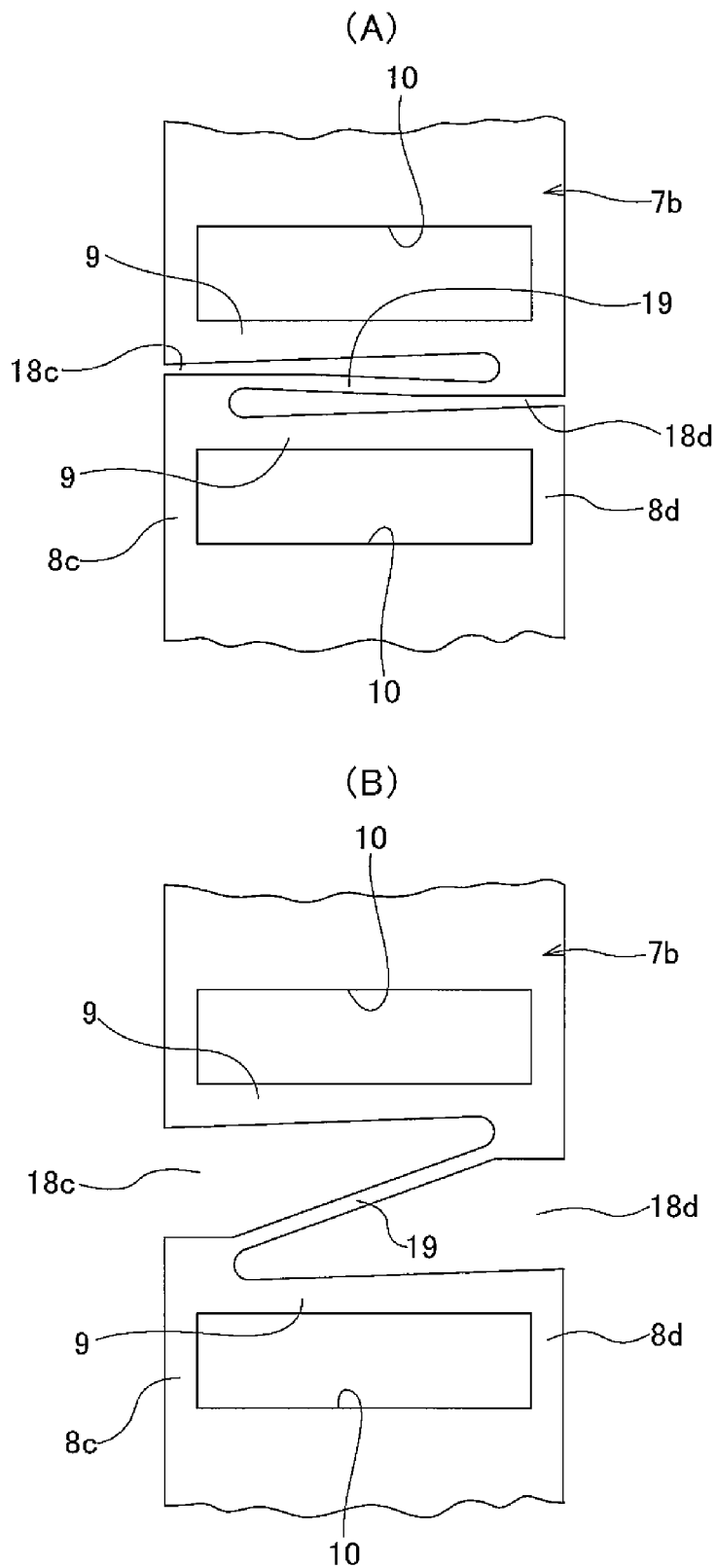
FIGS. 27A and 27B are views as seen from the outside in the radial direction of part of a cage for a radial roller bearing having conventional construction and having a non-continuous section in one location in the circumferential direction, where
Figure 28:
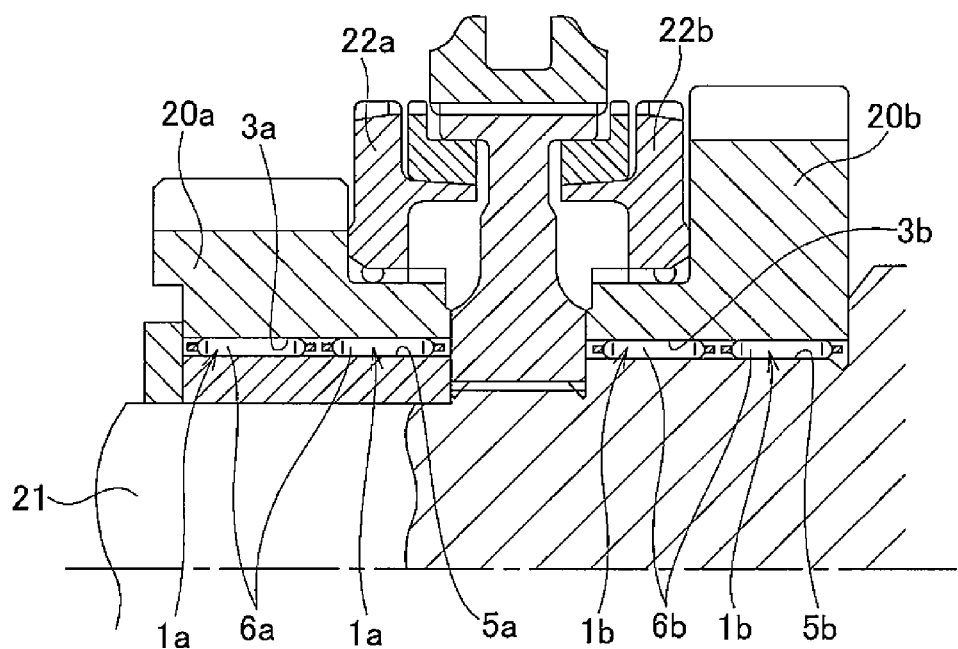
FIG. 28 is a partial cross-sectional view of a manual transmission for an automobile, and illustrates an example of the state of using radial roller bearings.

Furthermore, obtaining sufficient elastic force in the elastic connecting section 19a, 19b is due to the elastic connecting section 19a, 19b being constructed such that the outer-diameter side elastic connecting section 26, 26a and the inner-diameter side elastic connecting section 27, 27a, which are capable of elastic deformation in the circumferential direction, overlap in the radial direction of the cage 7j, 7k. In other words, the outer-diameter side elastic connecting section 26, 26a and the inner-diameter side elastic connecting section 27, 27a respectively have elastic force, and a combination of the elastic force in the circumferential direction of the two can be obtained. Moreover, the outer-diameter side elastic connecting section 26, 26a and the inner-diameter side elastic connecting section 27, 27a do not interfere with each other in the axial direction, so the entire length of the outer-diameter side elastic connecting section 26, 26a and the inner-diameter side elastic connecting section 27, 27a (length in the axial direction) can be made sufficiently large within the range of the dimension in the axial direction (full width) of the cage 7j, 7k. Therefore, the outer-diameter side elastic connecting section 26, 26a and the inner-diameter side elastic connecting section 27, 27a can display sufficient elastic force (spring force). More specifically, with the construction of these examples, and elastic force that is about two times that of the elastic force in the case of conventional construction illustrated in FIG. 27. Particularly, with the cage 7k illustrated in the ninth example of an embodiment, the outer-diameter side elastic connecting section 26a and the inner-diameter side elastic connecting section 27a are V shaped, so it is possible to display even larger elastic force. Moreover, the outer-diameter side elastic connecting section 26, 26a and the inner-diameter side elastic connecting section 27, 27a are arranged so as to overlap in the radial direction of the cage 7j, 7k, so the formation space for the elastic connecting section 19a, 19b (space in the circumferential direction) is not large. Therefore, it is possible to obtain sufficient elastic force in the elastic connecting section 19a, 19b even when the formation space for the elastic connecting section 19a, 19b is small.

Stabilizing the behavior is due the shape of the outer-diameter side elastic connecting section 26, 26a and the inner-diameter side elastic connecting section 27, 27a of the elastic connecting section being inverted with respect to each other in the axial direction. In other words, by employing this kind of construction, when the diameter of the cage 7j, 7k expands or contracts during operation, of the forces acting on the end sections 12e, 12f from the outer-diameter side elastic connecting section 26, 26a and the inner-diameter side elastic connecting section 27, 27a, the forces that act in the axial direction cancel each other out. For example, when the diameter of the cage 7j is expanded, forces act on one end section in the circumferential direction of one rim section 8g and the other end section in the circumferential direction of the other rim section 8h from the outer-diameter side elastic connecting section 26 in directions that bring the rims sections closer together in the axial direction. On the other hand, forces act on one end section in the circumferential direction of the other rim section 8h and the other end section in the circumferential direction of the one rim section 8g from the inner-diameter side elastic connecting section 27 in directions that bring rim sections closer together in the axial direction. Therefore, two forces, the sizes of which are equal, act in opposite directions in the axial direction on the end sections 12e, 12f that are provided on both sides of the cuts 18e, 18f. As a result, the forces acting in the axial direction cancel each other out. Moreover, similarly, in the case of the cage 7k of the eighth example of an embodiment as well, the forces acting in the axial direction cancel each other out. Therefore, when expanding or contracting the diameter of the cage 7j, 7k, it is possible to effectively prevent the side surfaces in the axial direction of one end section in the circumferential and the side surface in the axial direction of the other end section in the circumferential direction of the rim sections 8g, 8h from shifting from being on the same plane, and it is possible to effectively prevent the side surfaces in the axial direction of the rim sections 8g, 8h from becoming inclined with respect to the guide surface for guiding these side surfaces in the axial direction (virtual planes that are orthogonal to the center axis of the cage 7j, 7k). Moreover, in the examples, even when the outer-diameter side elastic connecting section 26, 26a and the inner-diameter side elastic connecting section 27, 27a cool and contract more than the other portions, the amounts of cooling and contraction of the outer-diameter side elastic connecting section 26, 26a and the inner-diameter side elastic connecting section 27, 27a can be the same. Therefore, it is possible to effectively prevent the side surfaces on one end section in the circumferential direction of the rim sections 8g, 8h and the side surfaces on the other end section in the circumferential direction from shifting from being on the same plane. Consequently, the side surface in the axial direction of the rim sections 8g, 8h can be prevented from inclining with respect to the guide surfaces. Moreover, it is also possible to effectively prevent the occurrence of skewing of the rollers that are held in the pockets that are located near the end sections 12e, 12f that are provided on both sides of the cuts 18e, 18f. As a result, it is possible to stabilize the behavior of the cage 7j, 7k.

Furthermore, the cage 7j, 7k are such that the shape, including the shape of the outer-diameter side elastic connecting section 26, 26a, the inner-diameter side elastic connecting section 27, 27a and the rim sections 8g, 8h, is regulated to a shape such that the pair of split molds can be removed in the axial direction, or in other words, so that the pair of split molds can be pulled apart after injection without damaging the cage 7j, 7k. Therefore, it is possible to make the cage using axial draw molding, and thus it is possible to keep the manufacturing cost low.

Moreover, when a force is applied to the cage 7j, 7k in a direction that causes the width of the cuts 18e, 18f in the rim sections 8g, 8h to expand in the circumferential direction, the elastic connecting section 19a, 19b elastically deforms and stretches in the circumferential direction. As a result, it is possible to expand the diameter of the cage 7j, 7k. When a force is applied to the cage 7j, 7k in a direction that causes the width of the cuts 18e, 18f in the rim sections 8g, 8h to contract in the circumferential direction, the elastic connecting section 19a, 19b elastically deforms and contracts in the circumferential direction. As a result, it is possible to cause the diameter of the cage 7j, 7k to contract. When the force acting on the cage 7j, 7k is released, the elastic connecting section 19a, 19b returns to the original state by the elastic restoration force, and thus it is possible to return the diameter dimension of the cage 7j, 7k to the original state. The diameter of cage 7j, 7k expands within the limited range of the amount of stretching of the elastic connecting section 19a, 19b, and does not expand excessively so as to exceed that limit. Moreover, the diameter of the cage 7j, 7k contracts to the limit where both end surface on both sides of the cuts 18e, 19f come in contact with each other, and does not contract excessively so as to exceed that limit.

In this way, the elastic connecting section 19a, 19b performs the roll of spring, and allows the cage 7j, 7k to expand or contract within a specified range. As a result, for example, when the bearing in which the cage 7j, 7k is installed is rotating at high speed, the cage 7j, 7k is allowed to expand due to the centrifugal force that is acting, however, when the bearing is rotating at low speed, the cage 7j, 7k is allowed to smoothly contract to the original diameter. Therefore, it is possible to change and adjust the location of contact between the inner surfaces of the pockets 10 and the circumferential surfaces of the rollers, and it is possible to effectively prevent damage due to fretting. Moreover, even when a large load (for example, a radial load) is applied to the bearing in which the cage 7j, 7k is assembled, by expanding or contracting the diameter of the cage 7j, 7k, the contact location between the inner surfaces of the pockets 10 and the circumferential surfaces of the rollers is changed and adjusted, so it is also possible to effectively escape the load. Therefore, it is possible to improve the durability of the cage 7j, 7k.

The thickness (width dimension) of the outer-diameter side elastic connecting section and inner-diameter side elastic connecting section of the elastic connecting section does not need to be fixed over the entire length, and by taking into consideration the operating conditions of the radial roller bearing, the strength of the outer-diameter side elastic connecting section and inner-diameter side elastic connecting section, the injection molding characteristics and the like, part can be made thicker or thinner. For example, in order to maintain strength, the root end (connecting section) can be made thicker. Moreover, the shape of the outer-diameter side elastic connecting section and the inner-diameter elastic connecting section is not limited to being a straight linear shape or V shape, and various shapes can be used such as a wave shape, crank shape, U shape, Z shape, M shape and the like.

Tenth Example

Figure 23:
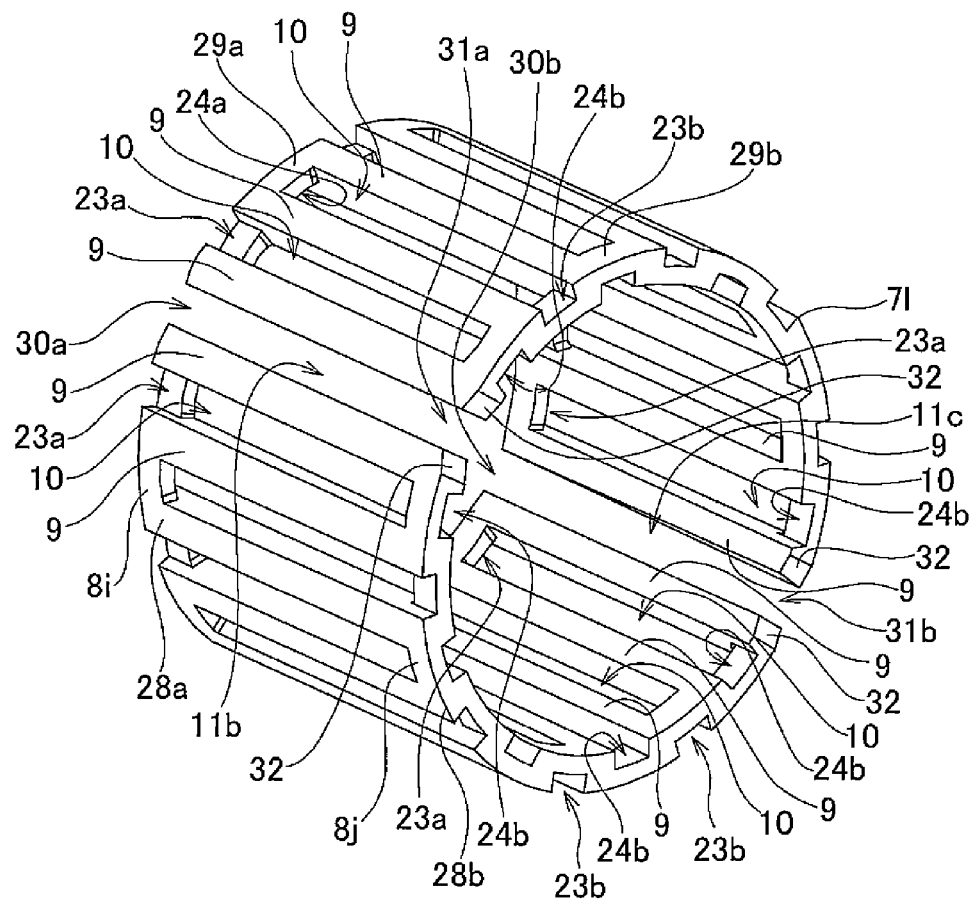
FIG. 23 is a perspective view illustrating the overall construction of a cage for a radial roller bearing of a tenth example of an embodiment of the present invention.
Figure 24:
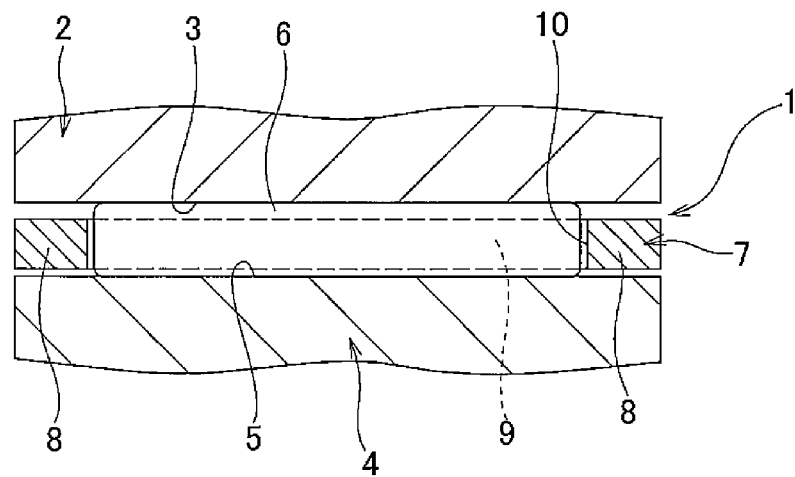
FIG. 24 is a cross-sectional drawing of a rotational support section in which a radial roller bearing having a cage is assembled.
Figure 25:
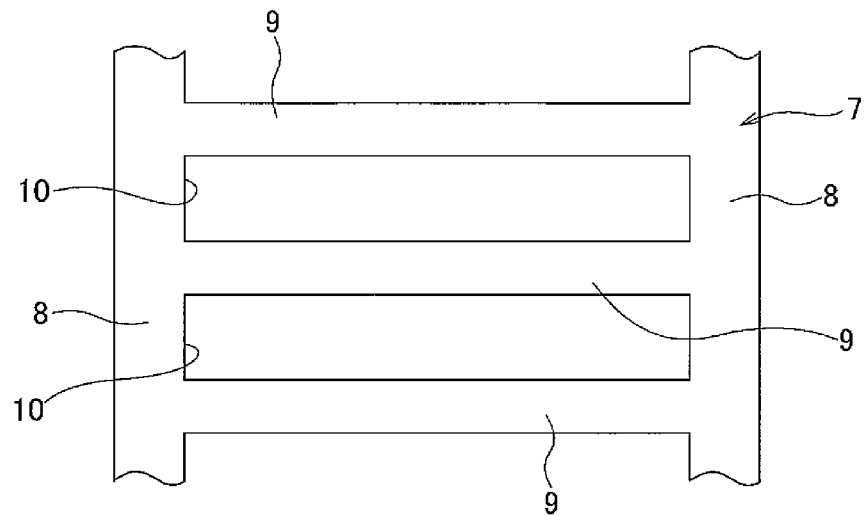
FIG. 25 is a view of part in circumferential direction of a cage as seen from the outside in the radial direction.
Figure 26:
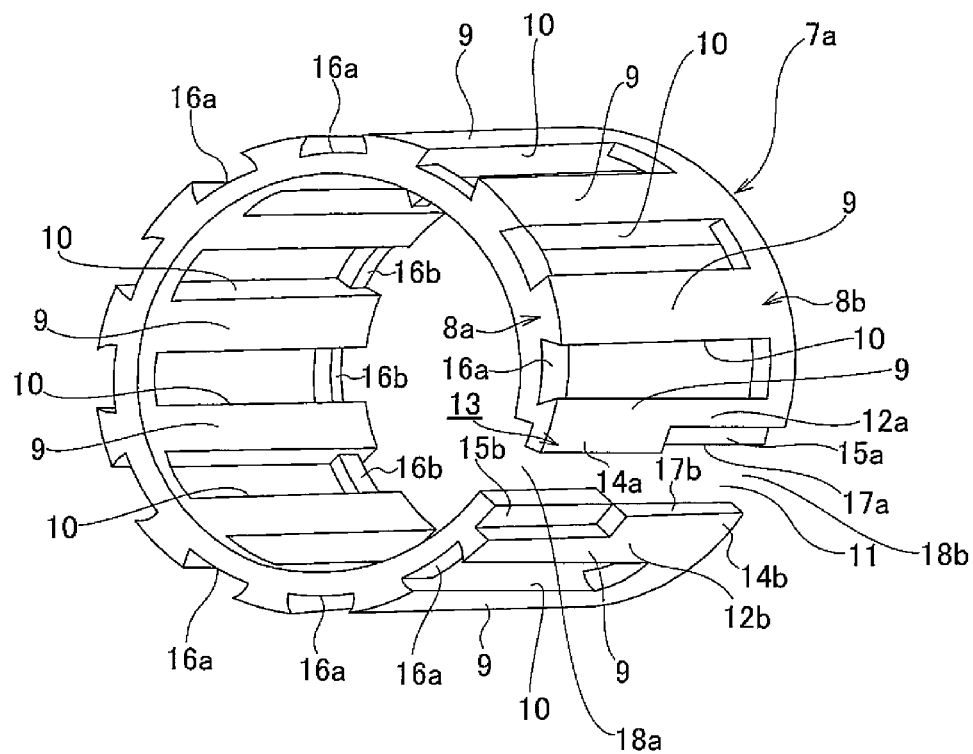
FIG. 26 is a perspective view of a cage for a radial roller bearing having conventional construction.

FIG. 23 illustrates a cage 7l of a tenth example of an embodiment of the present invention. Each of the pair of rim sections 8*i*, 8*j* of the cage 7*l* has a two-block construction that comprises two circular arc shaped divided parts 28*a*, 29*a*, 28*b*, 29*b*. The cage 7*l* of this example is such that, together with having outer-diameter side concave sections 23*a*, 23*b* and inner-diameter side concave sections 24*a*, 24*b* that are uniformly provided in the pair of rim sections 8*i*, 8*j* (divided parts 28*a*, 29*a*, 28*b*, 29*b*), the outer-diameter side concave sections 23*a*, 23*b* and the inner-diameter side concave sections 24*a*, 24*b* are uniformly provided on the outer diameter side and the inner-diameter side of the rim sections 8*i*, 8*j*. The basic cage construction is common with that of the cage 7*c* of the first example of an embodiment, and cage 7*e* of the third example of an embodiment, so the same reference numbers are used for identical or similar components in the drawings.

The pair of rim sections 8*i*, 8*j* are such that cuts 30*a*, 30*b*, 31*a*, 31*b* are provided in portions where the phase in the circumferential direction is nearly the same. As a result, the cage 7*l* is a cylindrical shape that has non-continuous sections 11*b*, 11*c* at two locations in the circumferential direction. The diameter dimension (radius of curvature) and the interval in between in the axial direction of the rim section 8*i* (divide parts 28*a*, 29*a*) and the rim section 8*j* (divided parts 28*b*, 29*b*) can be set arbitrarily according to the size of the bearing.

Together with providing outer-diameter side concave sections 23*a*, 23*b* that are recessed inward in the radial direction at a plurality of locations in the portions on the outer circumferential surfaces of the pair of rim sections 8*i*, 8*j* that are aligned in the axial direction with the pockets 10, inner-diameter side concave sections 24*a*, 24*b* that are recessed outward in the radial direction are provided in a plurality of locations having a different phase in the circumferential direction than the outer-diameter side concave sections 23*a*, 23*b* in portions on the inner circumferential surfaces of the rim sections 8*i*, 8*j* that are aligned with the pockets 10. In other words, the pair of rim sections 8*i*, 8*j* are such that the outer circumferential surface has a continuous uneven shape composed of the outer-diameter side concave sections 23*a*, 23*b* and the remaining sections (continuous sections with the outer circumferential surface of the column sections 9), and the inner circumferential surface has a continuous uneven shape composed of the inner-diameter side concave sections 24*a*, 24*b* and the remaining sections (continuous sections with the inner circumferential surface of the column sections 9). In one rim section 8*i* and in the other rim section 8*j*, the phases in the circumferential direction of the outer-diameter side concave sections 23*a*, 23*b* and the inner-diameter side concave sections 24*a*, 24*b* differ, so the outer-diameter side concave sections 23*a*, 23*b* and the inner-diameter side concave sections 24*a*, 24*b* do not overlap in the radial direction in portions on the outer circumferential surfaces and inner circumferential surfaces of the rim sections 8*i*, 8*j* having the same phase in the circumferential direction. In the case of the construction illustrated in FIG. 23, in one rim section 8*i*, outer-diameter side concave sections 23*a* and inner-diameter side concave sections 24*a* are provided so as to alternate one at a time in the circumferential direction, and in the other rim section 8*j*, outer-diameter side concave sections 23*b* and inner-diameter side concave sections 24*b* are provided so as to alternate one at a time in the circumferential direction.

Moreover, the phase in the circumferential direction of the outer-diameter side concave sections 23*a*, 23*b* and the inner-diameter side concave sections 24*a*, 24*b* differ between the one rim section 8*i* and the other rim section 8*j*. In other words, together with the phase in the circumferential direction of the outer-diameter side concave sections 23*a* that are provided in one rim section 8*i* differing from that of the outer-diameter side concave sections 23*b* that are provided in the other rim section 8*j*, the phase in the circumferential direction of the inner-diameter side concave sections 24*a* that are provided in one rim section 8*i* differs from that of the inner-diameter side concave sections 24*b* that are provided in the other rim section 8*j*. As a result, one each of outer-diameter side concave sections 23*a*, 23*b* and inner-diameter side concave sections 24*a*, 24*b* are arranged in portions of the rim sections 8*i*, 8*j* that are located on both sides in the axial direct on the pockets 10.

A plurality of column sections 9 are intermittently provided in the circumferential direction and span between the pair of rim sections 8*i*, 8*j*. The portions that are surrounded on four sides by column sections 9 that are adjacent in the circumferential direction and the pair of rim sections 8*i*, 8*j* function as pockets 10 for holding the rollers 6 so as to be able to roll freely. However, in this example, of the portions between column sections 9 that are adjacent in the circumferential direction, pockets are not provided in the portions where the phase in the circumferential direction coincides with the cuts 30*a*, 31*a*, 30*b*, 31*b*. Therefore, the cage 7*l* of this example is constructed such that there are no rollers in two locations in the circumferential direction (non-continuous sections 11*b*, 11*c*). In other words, pockets 10 are uniformly provided in the circumferential direction in portions of the cage 7*l* other than where the non-continuous sections 11*b*, 11*c* are located, and rollers are inserted into each of these pockets 10. The size of the pockets can be set according to the diameter and full length of the rollers, so that the rollers can be held inside the pockets 10 so as to be able to roll freely. The number of pockets 10 also is arbitrarily set according to the capacity (number of rollers assembled) of the radial roller bearing in which the cage 7*l* is assembled.

As described above, by forming cuts 30*a*, 30*b*, 31*a*, 31*b* at two locations in each of a pair of rim sections 8*i*, 8*j* (divided parts 28*a*, 29*a*, 28*b*, 29*b*), the cage 7*l* is constructed so as to have non-continuous sections 11*b*, 11*c* at two locations in the circumferential direction, so it is possible to freely expand or contract the diameter dimension of the cage 7*l*. Moreover, the cage 7*l* can be easily assembled around a shaft (inner-diameter side member) having various sizes of stepped sections or protruding sections.

The construction of the each of the examples of an embodiment described above, as long as there is no contradiction, can be partially replaced with or added to other construction, and can be applied to other examples.

INDUSTRIAL APPLICABILITY

The cage for a radial roller bearing of the present invention can be suitably used in a radial roller bearing that is assembled in various kinds of power mechanisms of an automobile or train car, and particularly in the rotational support section of an automobile transmission. However, the use of the radial roller bearing in which the cage for a radial roller bearing of the present invention is assembled is not limited to this.

EXPLANATION OF THE REFERENCE NUMBERS 1, 1*a*, 1*b* Radial roller bearing
2 Outer-diameter side member
3, 3*a*, 3*b* Outer-ring raceway
4 Shaft
5, 5*a*, 5*b* Inner-ring raceway
6, 6*a*, 6*b* Roller
7, 7*a* to 7*l* Cage
8, 8*a* to 8*j* Rim section
9 Column section 10 Pocket
11, 11a to 11c Non-continuous section
12a to 12f End section
13, 13a to 13e Fitting section
14a to 14l Outer-diameter side fitting piece
15a to 15l Inner-diameter side fitting piece
16a Outer-diameter side concave section
16b Inner-diameter side concave section
17a to 17b End surface
18a to 18f Cut
19, 19a, 19b Elastic connecting section
20a, 20b Gear
21 Power transmission shaft
22a, 22b Synchronization mechanism
23a, 23b Outer-diameter side concave section
24a, 24b Inner-diameter side concave section
25a, 25b Insertion space
26, 26a Outer-diameter side elastic connecting section
27, 27a Inner-diameter side elastic connecting section
28a, 28b Divided part
29a, 29b Divided part
30a, 30b Cut
31a, 31b Cut
32 Side surface in the axial direction

What is claimed is:

1. A cage for a radial roller bearing, which is made by axial draw molding of synthetic resin that uses a mold comprising a pair of split molds, comprising:

a pair of rim sections that are circular ring shaped and that are concentric with each other, being separated by an interval in an axial direction;

a plurality of column sections that are intermittently provided in a circumferential direction and span between the rim sections; and a plurality of pockets that are provided in portions that are surrounded on four sides by the rim sections and column sections that are adjacent in the circumferential direction, wherein outer-diameter side concave sections that are recessed inward in a radial direction are provided at a plurality of locations on outer circumferential surfaces of the rim sections in portions that are aligned in the axial direction with the pockets, and inner-diameter side concave sections that are recessed outward in the radial direction are provided at a plurality of locations on inner circumferential surfaces of the rim sections in portions that are aligned in the axial direction with the pockets and that have a phase in the circumferential direction that is different than a phase in the circumferential direction of the outer-diameter side concave sections, wherein the phase in the circumferential direction of the outer-diameter side concave sections and the phase in the circumferential direction of the inner-diameter side concave sections differ between one rim section and the other rim section of the rim sections, and the outer-diameter concave sections and the inner-diameter concave sections are arranged one at a time in portions of the rim sections that are located on both sides in the axial direction of the pockets, wherein each of the rim sections is an incomplete ring shape having a cut in one location in the circumferential direction, and by expanding widths of the cuts in the circumferential direction, it is possible to elastically expand diameters of the rim sections, and in the one rim section and the other rim section, phases of the cuts virtually coincide in the circumferential direction, wherein an elastic connecting section that can elastically deform in the circumferential direction is provided to span between end sections of the rim sections and the plurality of column sections on both sides of the cuts that can move apart from or toward each other in the circumferential direction, and wherein one end section of both end sections in the circumferential direction on both sides of the cut in one rim section that face each other, and the end section on the opposite side in the circumferential direction for the one end section of both end sections in the circumferential direction on both sides of the cut in the other rim section that face each other are connected together by the elastic connecting section.

2. A cage for a radial roller bearing, which is made by axial draw molding of synthetic resin that uses a mold comprising a pair of split molds, comprising:

a pair of rim sections that are circular ring shaped and that are concentric with each other, being separated by an interval in an axial direction;

a plurality of column sections that are intermittently provided in a circumferential direction and span between the rim sections; and a plurality of pockets that are provided in portions that are surrounded on four sides by the rim sections and column sections that are adjacent in the circumferential direction, wherein outer-diameter side concave sections that are recessed inward in a radial direction are provided at a plurality of locations on outer circumferential surfaces of the rim sections in portions that are aligned in the axial direction with the pockets, and inner-diameter side concave sections that are recessed outward in the radial direction are provided at a plurality of locations on inner circumferential surfaces of the rim sections in portions that are aligned in the axial direction with the pockets and that have a phase in the circumferential direction that is different than a phase in the circumferential direction of the outer-diameter side concave sections, wherein the phase in the circumferential direction of the outer-diameter side concave sections and the phase in the circumferential direction of the inner-diameter side concave sections differ between one rim section and the other rim section of the rim sections, and the outer-diameter concave sections and the inner-diameter concave sections are arranged one at a time in portions of the rim sections that are located on both sides in the axial direction of the pockets, wherein each of the rim sections is an incomplete ring shape having a cut in one location in the circumferential direction, and by expanding widths of the cuts in the circumferential direction, it is possible to elastically expand diameters of the rim sections, and in the one rim section and the other rim section, phases of the cuts virtually coincide in the circumferential direction, wherein an elastic connecting section that can elastically deform in the circumferential direction is provided to span between end sections of the rim sections and the plurality of column sections on both sides of the cuts that can move apart from or toward each other in the circumferential direction, and wherein the elastic connecting section comprises an outer-diameter side elastic connecting section and an inner-diameter side elastic connecting section that are capable of elastically deforming in the circumferential direction, and the outer-diameter side elastic connecting section and the inner-diameter side elastic connecting section overlap each other in the radial direction.

3. The cage for a radial roller bearing according to claim 2, wherein the outer-diameter side elastic connecting section and the inner-diameter side elastic connecting section have shapes that are inverted with respect to each other in the axial direction of the cage for a radial roller bearing.

4. The cage for a radial roller bearing according to claim 3, wherein
the outer-diameter side elastic connecting section and the inner-diameter side elastic connecting section have a linear shape and cross in the center portion in the axial direction of the cage for a radial roller bearing;
one end section in the circumferential direction of the outer-diameter side elastic connecting section is connected to a portion on one side in the axial direction of a portion on the outer-diameter side of one end section of both end sections that are provided on both sides of the cut, and the other end section in the circumferential direction of the outer-diameter side elastic connecting section is connected to a portion on the other side in the axial direction of a portion on the outer-diameter side of the other end section of both end sections that are provided on both sides of the cut; and
one end section in the circumferential direction of the inner-diameter side elastic connecting section is connected to a portion on the other side in the axial direction of a portion on the inner-diameter side of the one end section, and the other end section in the circumferential direction of the inner-diameter side elastic connecting section is connected to a portion on one side in the axial direction of a portion on the inner-diameter side of the other end section.

5. The cage for a radial roller bearing according to claim 3, wherein
the outer-diameter side elastic connecting section and the inner-diameter side elastic connecting section each have a V shape;
one section in the circumferential direction of the outer-diameter side elastic connecting section connects to a portion on one side in the axial direction of a portion on the outer-diameter side of one end section of both end sections that are provided on both sides of the cut, and the other end section in the circumferential direction of the outer-diameter side elastic connecting section connects to a portion on one side in the axial direction of a portion on the outer diameter side of the other end section of both end sections that are provided on both sides of the cut; and
one end section in the circumferential direction of the inner-diameter side elastic connecting section connects to a portion on the other side in the axial direction of a portion on the inner-diameter side of the one end section, and the other end section in the circumferential direction of the inner-diameter side elastic connecting section connects to a portion on the other side in the axial direction of a portion on the inner-diameter side of the other end section.

6. A cage for a radial roller bearing, which is made by axial draw molding of synthetic resin that uses a mold comprising a pair of split molds, comprising:
a pair of rim sections that are circular ring shaped and that are concentric with each other, being separated by an interval in an axial direction;
a plurality of column sections that are intermittently provided in a circumferential direction and span between the rim sections; and
a plurality of pockets that are provided in portions that are surrounded on four sides by the rim sections and column sections that are adjacent in the circumferential direction,
wherein outer-diameter side concave sections that are recessed inward in a radial direction are provided at a plurality of locations on outer circumferential surfaces of the rim sections in portions that are aligned in the axial direction with the pockets, and inner-diameter side concave sections that are recessed outward in the radial direction are provided at a plurality of locations on inner circumferential surfaces of the rim sections in portions that are aligned in the axial direction with the pockets and that have a phase in the circumferential direction that is different than a phase in the circumferential direction of the outer-diameter side concave sections,
wherein the phase in the circumferential direction of the outer-diameter side concave sections and the phase in the circumferential direction of the inner-diameter side concave sections differ between one rim section and the other rim section of the rim sections, and the outer-diameter concave sections and the inner-diameter concave sections are arranged one at a time in portions of the rim sections that are located on both sides in the axial direction of the pockets,
wherein each of the rim sections is an incomplete ring shape having a cut in one location in the circumferential direction, and by expanding widths of the cuts in the circumferential direction, it is possible to elastically expand diameters of the rim sections, and in the one rim section and the other rim section, phases of the cuts virtually coincide in the circumferential direction,
wherein a fitting section is provided between end sections of the rim sections and the column section on both sides of location of the cut that are able to move apart from or toward each other in the circumferential direction, and this fitting section does not allow relative displacement of the end sections in either the axial direction or radial direction of the end sections,
wherein the fitting section is such that an outer-diameter side fitting piece is provided in a portion of one side in the axial direction of a portion on the outer diameter side of one end section of the end sections that are provided on both sides of the cut, and is provided in a state so as to extend in the circumferential direction toward the other end section, and an inner-diameter side fitting piece is provided on a portion of the other side in the axial direction of a portion on the inner-diameter side of the one end section, and is provided in a state so as to extend in the circumferential direction toward the one end section, and furthermore, an outer-diameter side fitting piece is provided on a portion on the other side in the axial direction of a portion on the outer-diameter side of the other end section, and is provided so as to extend in the circumferential direction toward the one end section, and an inner-diameter side fitting piece is provided on a portion on one side in the axial direction of a portion on the inner-diameter side of the other end section, and is provided so as to extend in the circumferential direction toward the one end section; and together with the outer-diameter side fitting pieces and the inner-diameter side fitting pieces fitting together in the axial direction in portions on the outer-diameter side and portions on the inner-diameter side of the fitting section, the outer-diameter side fitting pieces and the inner diameter side fitting pieces fit together in the radial direction in portions on one side in the axial direction and portions on the other side in the axial direction of the fitting section, and wherein the dimensions in the axial direction between the outer-diameter side fitting pieces and the inner-diameter side fitting pieces are different from each other, the gap between the end surface in the circumferential direction of the outer-diameter side fitting piece having the larger dimension in the axial direction of the outer-diameter side fitting pieces and the opposing surface that faces that end surface in the circumferential direction is less than the gap between the end surface in the circumferential direction of the outer-diameter side fitting piece having the smaller dimension in the axial direction of the outer-diameter side fitting sections and the opposing surface that faces that surface in the circumferential direction, and the gap between the end surface in the circumferential direction of the inner-diameter side fitting piece having the larger dimension in the axial direction of the inner-diameter side fitting pieces and the opposing surface that faces that end surface in the circumferential direction is less than the gap between the end surface in the circumferential direction of the inner-diameter fitting piece having the smaller dimension in the axial direction of the inner-diameter side fitting pieces and the opposing surface that faces that end surface in the circumferential direction.

7. The cage for a radial roller bearing according to claim 6, wherein the gap between the end surface in the circumferential direction of the outer-diameter side fitting piece having the larger dimension in the axial direction and the opposing surface that faces that end surface in the circumferential direction is the same as the gap between the end surface in the circumferential direction of the inner-diameter side fitting piece having the larger dimension in the axial direction and the opposing surface that faces that end surface in the circumferential direction.

8. A cage for a radial roller bearing, which is made by axial draw molding of synthetic resin that uses a mold comprising a pair of split molds, comprising:
   a pair of rim sections that are circular ring shaped and that are concentric with each other, being separated by an interval in an axial direction;
   a plurality of column sections that are intermittently provided in a circumferential direction and span between the rim sections; and
   a plurality of pockets that are provided in portions that are surrounded on four sides by the rim sections and column sections that are adjacent in the circumferential direction, wherein outer-diameter side concave sections that are recessed inward in a radial direction are provided at a plurality of locations on outer circumferential surfaces of the rim sections in portions that are aligned in the axial direction with the pockets, and inner-diameter side concave sections that are recessed outward in the radial direction are provided at a plurality of locations on inner circumferential surfaces of the rim sections in portions that are aligned in the axial direction with the pockets and that have a phase in the circumferential direction that is different than a phase in the circumferential direction of the outer-diameter side concave sections, wherein the phase in the circumferential direction of the outer-diameter side concave sections and the phase in the circumferential direction of the inner-diameter side concave sections differ between one rim section and the other rim section of the rim sections, and the outer-diameter concave sections and the inner-diameter concave sections are arranged one at a time in portions of the rim sections that are located on both sides in the axial direction of the pockets, wherein each of the rim sections is an incomplete ring shape having a cut in one location in the circumferential direction, and by expanding widths of the cuts in the circumferential direction, it is possible to elastically expand diameters of the rim sections, and in the one rim section and the other rim section, phases of the cuts virtually coincide in the circumferential direction, wherein a fitting section is provided between end sections of the rim sections and the column sections on both sides of location of the cut that are able to move apart from or toward each other in the circumferential direction, and this fitting section does not allow relative displacement of the end sections in either the axial direction or radial direction of the end sections, and wherein insertion spaces are formed in portions on both sides of the fitting section by offsetting the end sections in the axial direction of the fitting section further toward the center side in the axial direction than the rim sections.

* * * * *